(12) United States Patent
Murakami et al.

(10) Patent No.: US 9,540,041 B2
(45) Date of Patent: Jan. 10, 2017

(54) POWER STEERING APPARATUS AND METHOD FOR ASSEMBLING POWER STEERING APPARATUS

(71) Applicant: Hitachi Automotive Systems Steering, Ltd., Saitama (JP)

(72) Inventors: Hiroki Murakami, Atsugi (JP); Shinichi Isobe, Ebina (JP); Kohtaro Shiino, Isehara (JP)

(73) Assignee: HITACHI AUTOMOTIVE SYSTEMS STEERING, LTD., Saitama (JP)

( * ) Notice: Subject to any disclaimer, the term of this patent is extended or adjusted under 35 U.S.C. 154(b) by 48 days.

(21) Appl. No.: 14/658,004

(22) Filed: Mar. 13, 2015

(65) Prior Publication Data

US 2016/0083008 A1 Mar. 24, 2016

(30) Foreign Application Priority Data

Sep. 19, 2014 (JP) ................................ 2014-190975

(51) Int. Cl.
| | |
|---|---|
| *B62D 6/10* | (2006.01) |
| *B62D 5/22* | (2006.01) |
| *G01L 5/22* | (2006.01) |
| *B62D 5/04* | (2006.01) |

(52) U.S. Cl.
CPC ............... *B62D 6/10* (2013.01); *B62D 5/0421* (2013.01); *G01L 5/221* (2013.01)

(58) Field of Classification Search
CPC ....... B62D 6/10; B62D 5/0421; G01L 5/0421; G01L 5/221

USPC ................................................ 180/443, 444
See application file for complete search history.

(56) References Cited

U.S. PATENT DOCUMENTS

| | | | | |
|---|---|---|---|---|
| 6,595,074 | B2* | 7/2003 | Shimizu | B62D 5/0406 180/443 |
| 8,579,071 | B2* | 11/2013 | Yoshida | B62D 6/10 180/443 |
| 2011/0000319 | A1* | 1/2011 | Maehara | G01L 5/221 73/862.193 |
| 2011/0232988 | A1* | 9/2011 | Aoki | G01L 25/003 180/446 |
| 2014/0076655 | A1* | 3/2014 | Yoshida | G01L 5/221 180/446 |
| 2014/0130612 | A1* | 5/2014 | Takahashi | G01L 3/104 73/862.193 |
| 2014/0331788 | A1* | 11/2014 | Ishimoto | B62D 6/10 73/862.325 |

(Continued)

FOREIGN PATENT DOCUMENTS

JP 2014-055909 3/2014

*Primary Examiner* — Tony Winner
(74) *Attorney, Agent, or Firm* — Foley & Lardner LLP

(57) ABSTRACT

After a Hall IC sensor is set in a connector in such a manner that the Hall IC sensor and a harness are electrically connected to each other, the connector and the Hall IC sensor are inserted from an opposite side of a connector insertion hole in a radial direction toward one side of the connection insertion hole in the radial direction, and a first magnetism collection ring and a second magnetism collection ring are inserted into a torque sensor container portion from a first opening portion in such a manner that the Hall IC sensor is situated between the first magnetism collection ring and the second magnetism collection ring in the radial direction.

20 Claims, 8 Drawing Sheets

(56) References Cited

U.S. PATENT DOCUMENTS

| 2015/0211947 A1* | 7/2015 | Yoshida | B62D 6/10 73/862.325 |
| 2016/0016607 A1* | 1/2016 | Yoshida | B62D 6/10 180/446 |

* cited by examiner

POWER STEERING APPARATUS AND METHOD FOR ASSEMBLING POWER STEERING APPARATUS

BACKGROUND OF THE INVENTION

The present invention relates to a power steering apparatus and a method for assembling a power steering apparatus.

One known type of a conventional power steering apparatus is a power steering apparatus including a torque sensor that detects an input torque provided from a driver to a steering shaft with use of a magnetic sensor. This torque sensor includes a permanent magnet, a pair of yokes, and a pair of magnetism collection rings. The permanent magnet and the pair of yokes rotate relatively to each other by a steering operation performed by the driver. The pair of magnetism collection rings guide and collect a magnetic flux generated between the pair of yokes when the permanent magnet and the pair of yokes rotate relatively to each other. The magnetic sensor detects a magnetic flux passing through between the pair of magnetism collection rings with use of a Hall element.

Japanese Patent Application Public Disclosure No. 2014-055909 discusses a torque sensor including a pair of yokes and a pair of magnetism collection rings disposed so as to overlap each other in an axial direction of a steering shaft, and a magnetic sensor disposed in a radially generated space between the pair of magnetism collection rings.

SUMMARY OF THE INVENTION

There are needs toward the above-described conventional technique for further improvement of the assemblability of the apparatus.

An object of the present invention is to provide a power steering apparatus and a method for assembling a power steering apparatus that can achieve the improvement of the assemblability of the apparatus.

According to an aspect of the present invention, after a magnetic sensor is set in a connector in such a manner that the magnetic sensor and a harness are electrically connected to each other, the connector and the magnetic sensor are inserted from an opposite side of a connector insertion hole in a radial direction toward one side of the connection insertion hole in the radial direction, and a first magnetism collection ring and a second magnetism collection ring are inserted into a torque sensor container portion from a first opening portion in such a manner that the magnetic sensor is situated between the first magnetism collection ring and the second magnetism collection ring in the radial direction.

DETAILED DESCRIPTION OF THE PREFERRED EMBODIMENTS

First Embodiment

First, a configuration will be described.

[Electric Power Steering Apparatus]

Figure 1:
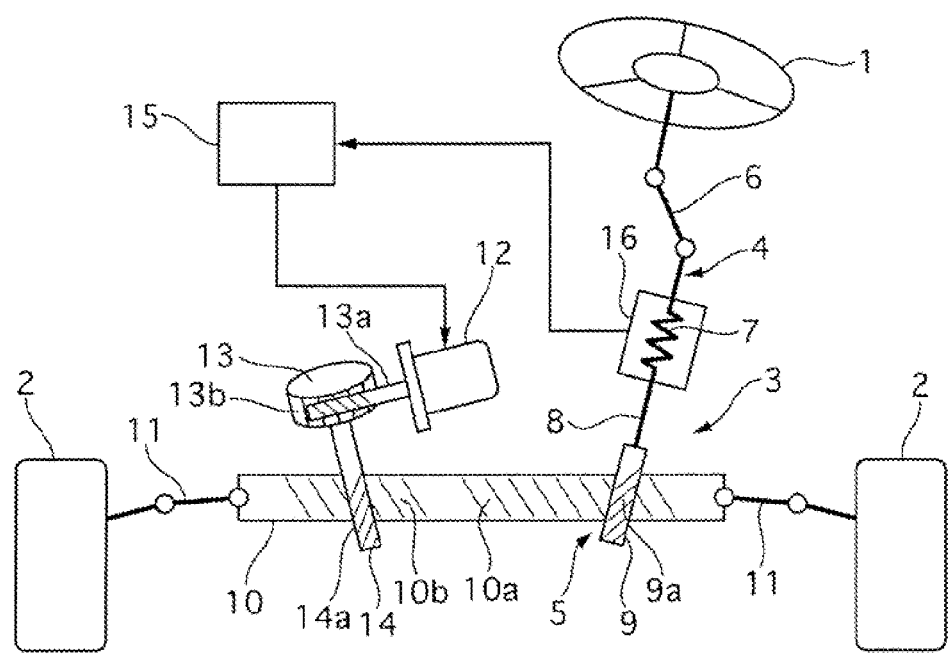
FIG. 1 illustrates a configuration of an electric power steering apparatus according to a first embodiment.

FIG. 1 illustrates a configuration of an electric power steering apparatus according to a first embodiment.

A steering mechanism 3 is disposed between a steering wheel 1 and steering target wheels 2 and 2. The steering mechanism 3 includes a steering shaft 4 and a conversion mechanism 5. The steering shaft 4 includes a steering shaft body (an input shaft) 6, a torsion bar 7, and a pinion shaft (an output shaft) 8. The steering shaft body 6 is connected to the steering wheel 1. The torsion bar 7 connects the steering shaft body 6 and the pinion shaft 8 to each other. A rotation of the steering shaft body 6 is transmitted to the pinion shaft 8 via the torsion bar 7. The conversion mechanism 5 includes a first pinion gear 9 and a rack bar 10. The first pinion gear 9 is connected to the pinion shaft 8. Tie rods 11 and 11 are connected to both left and right ends of the rack bar 10, respectively. The steering target wheels 2 and 2 are connected to the tie rods 11 and 11, respectively. First pinion teeth 9a are formed on the first pinion gear 9. Further, first rack teeth 10a, which is meshed with the first pinion teeth 9a, are formed on the rack bar 10. A rotation of the pinion shaft 8 is converted into turning operations of the steering target wheels 2 and 2 via the first pinion gear 9 and the rack bar 10.

An output of the electric motor 12 is transmitted to a second pinion gear 14 via a reducer 13 including a worm shaft 13a and a worm wheel 13b. Second pinion teeth 14a are formed on the second pinion gear 14. Further, second rack teeth 10b, which are meshed with the second pinion teeth 14a, are formed on the rack bar 10. A rotation of the electric motor 12 is converted into turning operations of the steering target wheels 2 and 2 via the second pinion gear 14 and the rack bar 10.

The electric motor 12 is, for example, a three-phase brushless motor. The electric motor 12 is rotationally driven according to an instruction signal output from a motor control circuit (a controller) 15. As a result, a steering assist force is provided to the steering mechanism 3.

A torque sensor 16 is provided at the steering shaft body 6. The torque sensor 16 detects a relative rotation between the steering shaft body 6 and the pinion shaft 8 (a torsion angle of the torsion bar 7). The motor control circuit 15 calculates the instruction signal to be provided to the electric motor 12 based on a steering torque generated between the steering shaft body 6 and the pinion shaft 8 that is acquired from an output signal from the torque sensor 16, and a running condition such as a vehicle speed, and outputs the calculated instruction signal to the electric motor 12.

[Gear Box Housing]

Figure 2:
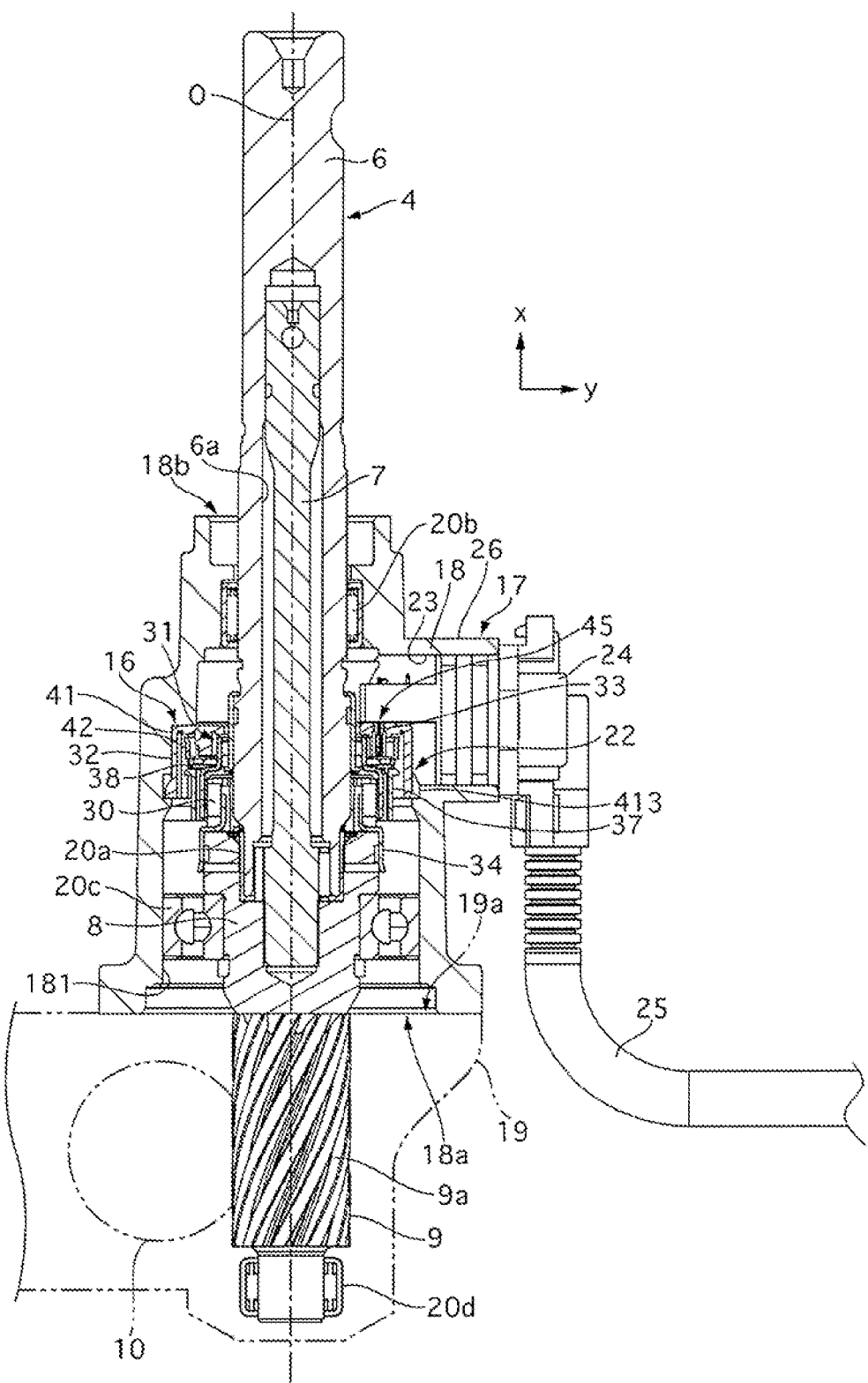
FIG. 2 is a vertical cross-sectional view illustrating a gear box housing 17 according to the first embodiment.
Figure 3:
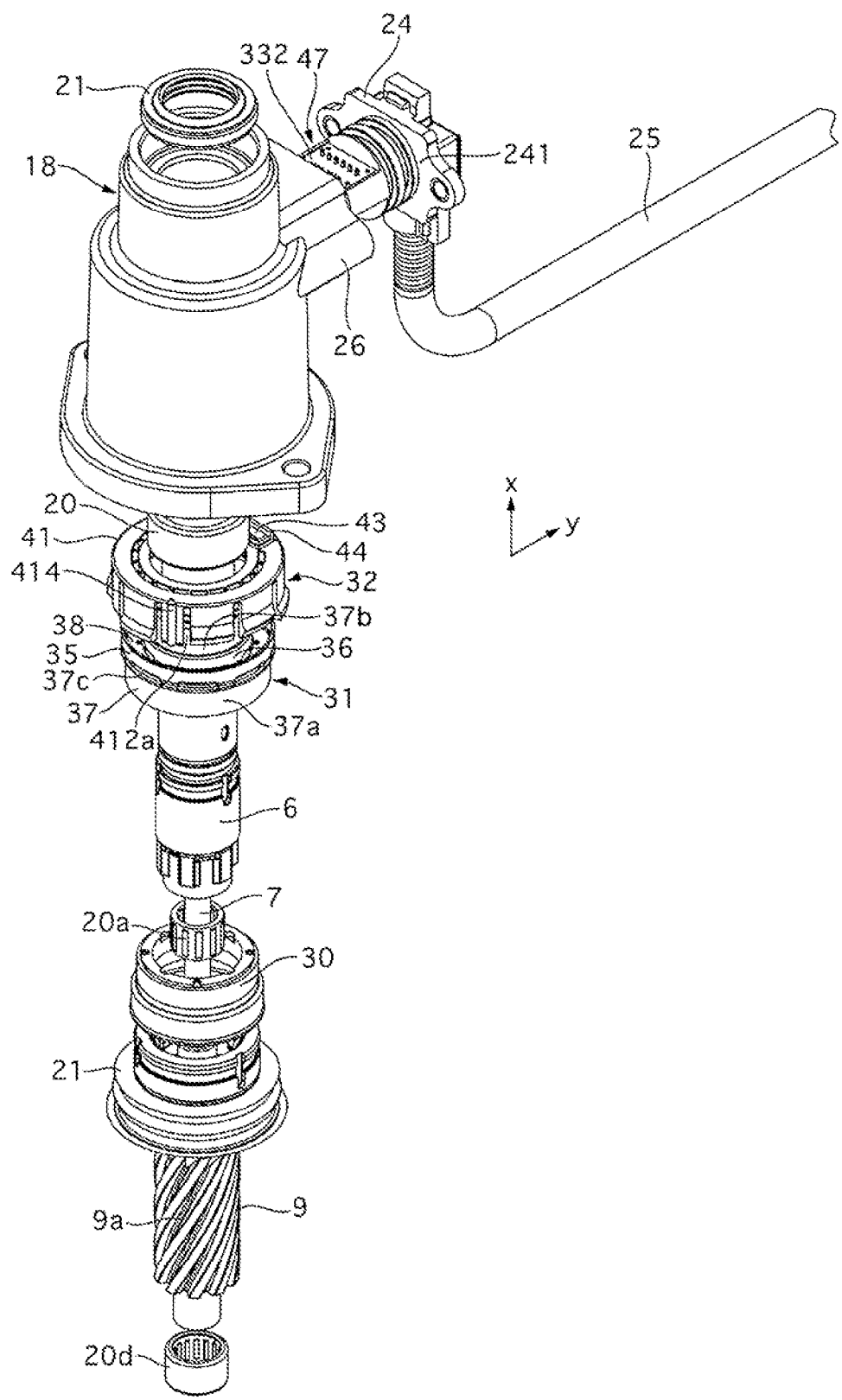
FIG. 3 is an exploded perspective view illustrating an inside of a first housing 18 according to the first embodiment.

FIG. 2 is a vertical cross-sectional view illustrating a gear box housing (housing) 17 according to the first embodiment. FIG. 3 is an exploded perspective view illustrating an inside of a first housing 18 according to the first embodiment.

A part of the above-described steering shaft 4 and the above-described conversion mechanism 5 are contained in the gear box housing 17. The steering shaft body 6 and the pinion shaft 8 rotates relative to the gear box housing 17 around a same rotational axis O. Hereinafter, an x axis is set to an axial direction along the rotational axis O with a positive direction and a negative direction of the x axis set to a steering shaft body 6 side, which is one side corresponding to the steering shaft body 6 of the steering shaft 4, and a pinion shaft 8 side, which is an opposite side corresponding to the pinion shaft 8 of the steering shaft 4, respectively.

The gear box housing 17 includes the first housing 18 and a second housing 19. The first housing 18 and the second housing 19 are integrally coupled to each other by being bolted. The first housing 18 and the second housing 19 each are formed with use of an aluminum-based material.

The first housing 18 is formed into a cylindrical shape extending in the x axis direction. A through-hole 181 is formed in the x axis direction of the first housing 18. A first opening portion 18a, which is open to the negative direction side of the x axis, is formed at an end of the through-hole 181 in the negative direction of the x axis. Further, an opening portion 18b, which is open to the positive direction side of the x axis, is formed at an end of the through-hole 181 in the positive direction of the x axis. A part of the steering shaft body 6 and a part of the torsion bar 7 protrude from the opening portion 18b toward the positive direction side of the x axis. A part of the steering shaft body 6, a part of the torsion bar 7, a part of the pinion shaft 8, and the torque sensor 16 are contained in the first housing 18. A hollow portion 6a is formed at an end of the steering shaft body 6 in the negative direction of the x axis. The torsion bar 7 is disposed within the hollow portion 6a except for an end of the torsion bar 7 in the negative direction of the x axis. An end of the torsion bar 7 in the positive direction of the x axis is fixed to the steering shaft body 6 within the hollow portion 6a. The end of the torsion bar 7 in the negative direction of the x axis is fitted to the pinion shaft 8 by spline fitting. The end of the steering shaft body 6 in the negative direction of the x axis, and an end of the pinion shaft 8 in the positive direction of the x axis are relatively rotatably connected to each other via a needle bearing 20a. Further, a needle bearing (a bearing) 20b, which rotatably supports the steering shaft body 6, is disposed in the first housing 18. The needle bearing 20b are disposed close to the opening portion 18b in the first housing 18. Further, a ball bearing 20c, which rotatably supports the pinion shaft 8, is disposed in the first housing 18. The ball bearing 20c is disposed close to the first opening portion 18a in the first housing 18. A space between an inner circumference of the opening portion 18b of the first housing 18 and an outer circumference of the steering shaft body 6 is closed by a seal ring 21.

A torque sensor container portion 22, which contains the torque sensor 16, is provided in the first housing 18. The torque sensor container portion 22 is located on the negative direction side of the x axis with respect to the needle bearing 20b, and on the positive direction side of the x axis with respect to the ball bearing 20c.

A connector mounting portion 26, which includes a connector insertion hole 23 therein, is provided in the first housing 18. The connector mounting portion 26 is provided so as to protrude from a radially inner side of the first housing 18 toward a radially outer side of the first housing 18. The connector insertion hole 23 is formed into a circular shape, and a central axis thereof extends orthogonally to the rotational axis O and intersects with the rotational axis O. Hereinafter, a y axis is set to an axial direction along the central axis of the connector insertion hole 23 with a positive direction and a negative direction of the y axis set to the radially outer side and the radially inner side, respectively. An end of the connector insertion hole 23 on the positive direction side of the y axis is open to an outer circumferential side of the first housing 18, and an end of the connection insertion hole 23 on the negative direction side of the y axis is open to the torque sensor container portion 22.

A detailed shape of the first housing 18 will be described below.

A connector 24 is mounted in the connector insertion hole 23. The connector 24 is inserted from the positive direction side of the y axis toward the negative direction side of the y axis along the connector insertion hole 23. A harness 25 is provided at the connector 24. The harness 25 is used to supply power from the motor control circuit 15 to the torque sensor 16, and transmit an electric signal output from the torque sensor 16 to the motor control circuit 15. The first housing 18 and the connector 24 are integrally connected to each other by being bolted. A detailed shape of the connector 24 will be described below.

A second opening portion 19a, which is open to the positive direction side of the x axis, is formed at an end of the second housing 19 in the positive direction of the x axis. The conversion mechanism 5, i.e., the first pinion gear 9 and the rack bar 10 are contained in the second housing 19. A needle bearing 20d, which rotatably supports the first pinion gear 9, is disposed in the second housing 19.

[Torque Sensor]

The torque sensor 16 includes a multipolar magnet (a magnetic member) 30, a yoke assembly 31, a magnetism collection ring assembly 32, and a Hall IC sensor (a magnetic sensor) 33. All of the multipolar magnet (the magnetic member) 30, the yoke assembly 31, and the magnetism collection ring assembly 32 are disposed concentrically with one another with central axes thereof set to the rotational axis O.

The multipolar magnet 30 is an annular permanent magnet. The multipolar magnet 30 has sixteen poles (the same numbers of N poles and S poles) alternatively magnetized at even intervals in a circumferential direction. The multipolar magnet 30 is fixed to the pinion shaft 8 via a magnetic holder 34.

First, a configuration of the yoke assembly 31 will be described.

Figure 4:
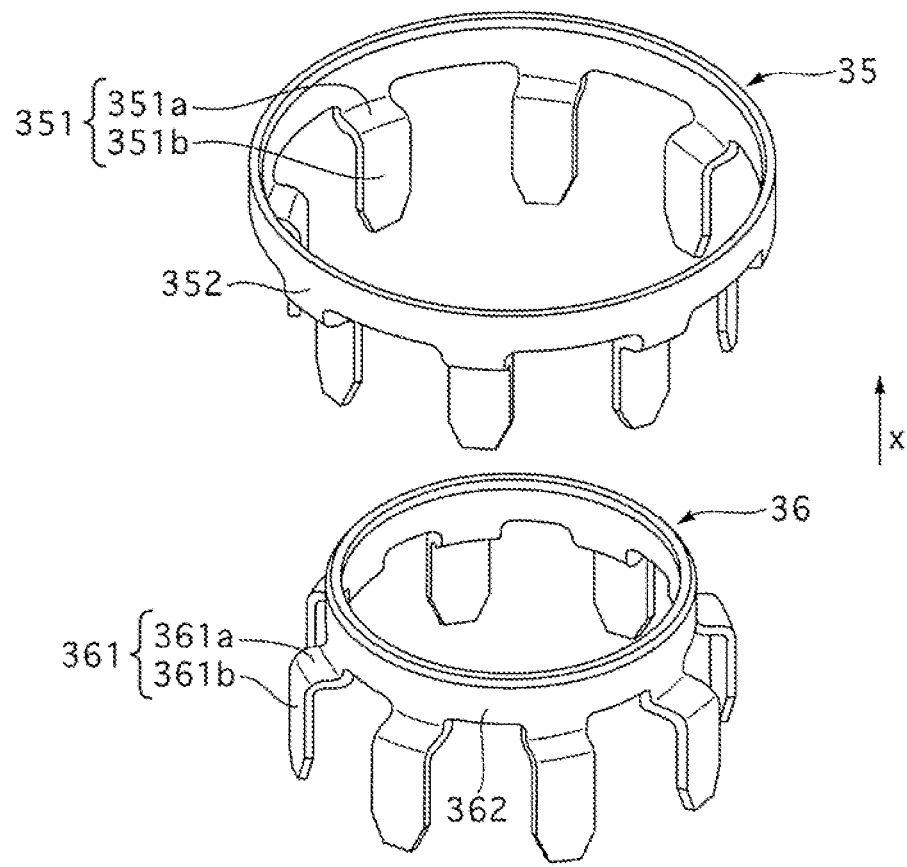
FIG. 4 is a perspective view illustrating a pair of yokes 35 and 36.

The yoke assembly 31 includes a pair of yokes 35 and 36, a yoke holder 37, and a welded plate 38. FIG. 4 is a perspective view illustrating the pair of yokes 35 and 36 according to the first embodiment. The pair of yokes 35 and 36 each are formed with use of a permalloy (a soft magnetic alloy), which is a magnetic material.

The first yoke (a first yoke member) 35 includes eight first claw portions 351 and a first annular portion 352. Each of the first claw portions 351 is a plate-like member, and a tip thereof is formed into a tapering shape. The first annular portion 352 is formed into an annular shape so as to surround the rotational axis O. The first annular portion 352 is disposed on the positive direction side of the x axis with respect to the first claw portions 351. Each of the first claw portions 351 includes a first bent portion 351a and a first detection portion 351b. The first bent portion 351a is formed so as to extend from the first annular portion 352 toward the radially inner side. The first detection portion 351b is formed so as to extend from the first bent portion 351a toward the negative direction side of the x axis. The first bent portion 351a is disposed so as to extend perpendicularly to the rotational axis O. The first detection portion 351b is disposed so as to extend perpendicularly to a radial direction of the rotational axis O. The first detection portions 351b are disposed on a circumference of a same circle. The first detection portion 351b faces the multipolar magnet 30 with a predetermined radial space generated therebetween.

The second yoke (a second yoke member) 36 includes eight second claw portions 361 and a second annular portion 362. Each of the second claw portions 361 is a plate-like member, and a tip thereof is formed into a tapering shape. Each of the second claw portions 361 has the same length as the first claw portion 351 in the x axis direction. The second annular portion 362 is formed into an annular shape so as to surrounding the rotational axis O. The second annular portion 362 is disposed on the positive direction side of the x axis with respect to the second claw portions 361. The second annular portion 362 is set so as to be smaller in diameter than the first annular portion 352. The first annular portion 352 and the second annular portion 362 face each other with a predetermined radial space generated therebetween. Each of the second claw portions 361 includes a second bent portion 361a and a second detection portion 361b. The second bent portion 361a is formed so as to extend from the second annular portion 362 toward the radially outer side. The second detection portion 361b is formed so as to extend from the second bent portion 361a toward the negative direction side of the x axis. The second bent portion 361a is disposed perpendicularly to the rotational axis O. The second detection portion 361b is disposed perpendicularly to the radial direction of the rotational axis O. The second detection portion 361b faces the multipolar magnet 30 with a predetermined radial space generated therebetween. The second detection portions 361b are disposed on the circumference of the same circle as the first detection portions 351b. Each of the first detection portions 351b and each of the second detection portions 361b are alternatively disposed with a predetermined space generated therebetween in the circumferential direction.

The pair of yokes 35 and 36 are disposed in such a manner that the tips of the first claw portions 351 and the tips of the second claw portions 361 point boundaries between the N poles and the S poles of the multipolar magnet 30, when the power steering apparatus is in a steering natural state in which no torque is applied to the steering shaft body 6 and the pinion shaft 8.

The yoke holder 37 is formed into a cylindrical shape including a large-diameter portion 37a and a small-diameter portion 37b with use of thermoplastic resin. The large-diameter portion 37a is located on the negative direction side of the x axis with respect to the small-diameter portion 37b. The annular portions 352 and 362 of the pair of yokes 35 and 36 are placed on a stepped surface 37c connecting the large-diameter portion 37a and the small-diameter portion 37b. The respective claw portions 351 and 361 of the pair of yokes 35 and 36 penetrate through the stepped portion 37c. The respective detection portions 351b and 361b of the claw portions 351 and 361 are located on an inner circumferential side of the large-diameter portion 37a. The yoke holder 37 is fixed at the small-diameter portion 37b thereof to the steering shaft body 6.

The welded plate 38 is formed into an annular shape with use of thermoplastic resin. The welded plate 38 is welded to the yoke holder 37 by ultrasonic welding while being in abutment with the bent portions 351a and 361a of the pair of yokes 35 and 36 from the positive direction side of the x axis. The ultrasonic welding is a technique for instantly welding thermoplastic resin with use of an ultrasonic micro vibration and a pressing force to joint it.

Next, a configuration of the magnetism collection ring assembly 32 will be described.

Figure 5:
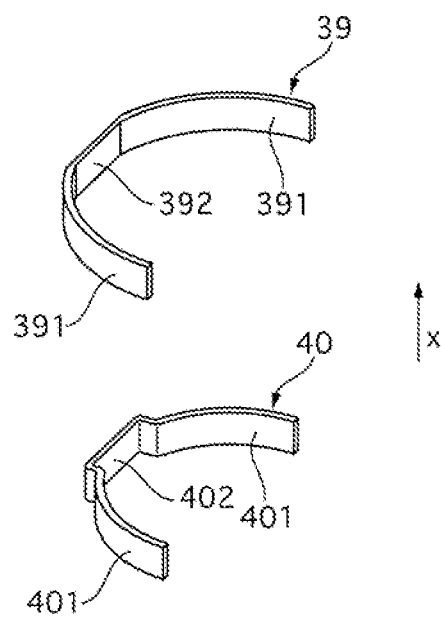
FIG. 5 is a perspective view illustrating a pair of magnetism collection rings 39 and 40 according to the first embodiment.

The magnetism collection ring assembly 32 includes a pair of magnetism collection rings 39 and 40, a magnetism collection ring holder (a magnetism collection ring holding member) 41, and a welded plate 42. FIG. 5 is a perspective view illustrating the pair of magnetism collection rings 39 and 40 according to the first embodiment. The pair of magnetism collection rings 39 and 40 each are formed into a C shape with use of a permalloy. The pair of magnetism collection rings 39 and 40 are disposed with a predetermined radial space generated therebetween, and are located at an intermediate position in the radial space between the annular portions 352 and 362 of the pair of yokes 35 and 36 while being out of contact with both the yokes 35 and 36.

The first magnetism collection ring 39 is formed so as to extend around the rotational axis O. The first magnetism collection ring 39 includes a pair of circular arc portions 391 and 391, and a magnetism collection portion 392. The pair of circular arc portions 391 and 391 is formed so as to face each other, and extend along a first virtual circle set around a point on the rotational axis O. The first virtual circle is set so as to be larger in diameter than the second annular portion 362 of the second yoke 36, and smaller in diameter than the first annular portion 352 of the first yoke 35. The magnetism collection portion 392 connects the pair of circular arc portions 391 and 391 to each other. The magnetism collection portion 392 is formed perpendicularly to the rotational axis O. Further, the magnetism collection portion 392 is disposed so as to be orthogonal to the y axis on the positive direction side of the y axis with respect to the rotational axis O.

The second magnetism collection ring 40 is formed so as to extend around the rotational axis O. The second magnetism collection ring 40 includes a pair of circular arc portions 401 and 401 and a magnetism collection portion 402. The pair of circular arc portions 401 and 41 are formed so as to face each other and extend along a second virtual circle set around a point on the rotational axis O. The second virtual circle is set so as to be smaller in diameter than the first virtual circle, and larger in diameter than the second annular portion 362 of the second yoke 36. The magnetism collection portion 402 connects the pair of circular arc portions 401 and 401 to each other. The magnetism collection portion 402 is formed so as to protrude toward the radially outer side and extend perpendicularly to the rotational axis O. Further, the magnetism collection portion 402 is disposed so as to be orthogonal to the y axis on the positive direction side of the y axis with respect to the rotational axis O.

Figure 6:
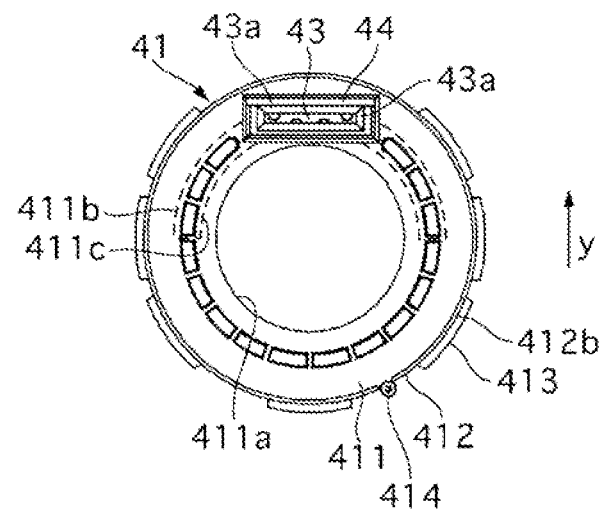
FIG. 6 illustrates a magnetism collection ring holder 41 according to the first embodiment as viewed from a positive direction side of an x axis toward a negative direction side of the x axis.
Figure 7:
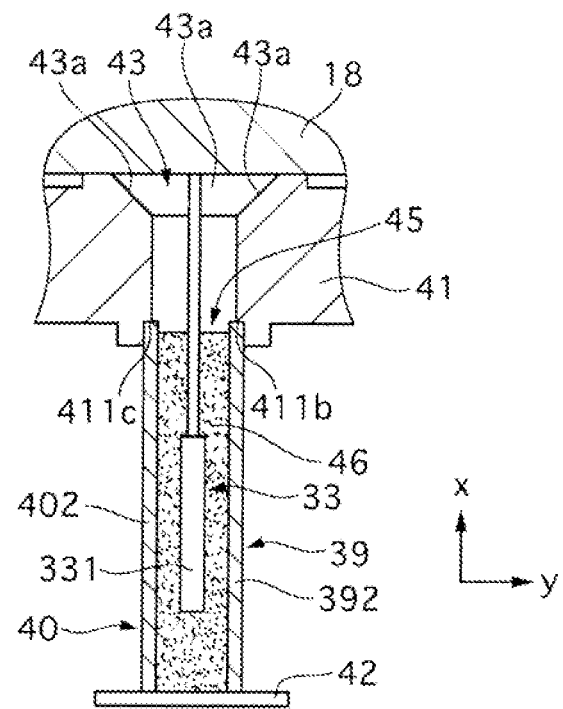
FIG. 7 is a vertical cross-sectional view illustrating main portions inside the first housing 18 according to the first embodiment.

FIG. 6 illustrates the magnetism collection ring holder 41 according to the first embodiment as viewed from the positive direction side of the x axis toward the negative direction side of the x axis. FIG. 7 is a vertical cross-sectional view illustrating main portions inside the first housing 18 according to the first embodiment.

The magnetism collection holder 41 is formed into a cylindrical shape with use of thermoplastic resin that is an insulating material. The magnetism collection ring holder 41 includes an annular portion 411 and an outer circumferential portion 412. The annular portion 411 is formed into an annular shape including an opening portion 411a at a center thereof. The steering shaft body 6 extends through the opening portion 411a. A first engagement groove 411b and a second engagement groove 411c are formed at an end of the annular portion 411 on the negative direction side of the x axis. An end of the first magnetism collection ring 39 in the positive direction of the x axis is engaged with the first engagement groove 411b. An end of the second magnetism collection ring 40 in the positive direction of the x axis is engaged with the second engagement groove 411c. Further, an opening portion 43 is formed at the annular portion 411. The opening portion 43 is disposed so as to face a space between the magnetism collection portions 392 and 402 of the pair of magnetism collection rings 39 and 40. The opening portion 43 is formed into a rectangular shape that allows a Hall element 331 of the Hall IC sensor 33 to be inserted therethrough. Further, four inclined surfaces 43a are formed at opening edges of the opening portion 43 at an end of the opening portion 43 in the positive direction of the x axis. Each of the inclined surfaces 43a is formed in such a manner that an opening width of the opening portion 43 gradually reduces from the positive direction side of the x axis toward the negative direction side of the x axis.

A connector engagement portion 44 is provided at the annular portion 411. The connector engagement portion 44 is disposed so as to protrude from the annular portion 411 toward the positive direction side of the x axis. The connector engagement portion 44 is formed into a rectangular plate orthogonal to the y axis. The connector engagement portion 44 is disposed along a circumferential edge of the opening portion 43 at an end of the opening portion 43 on the positive direction side of the y axis.

The outer circumferential portion 412 is formed so as to fully extend from an outer circumferential edge of the annular portion 411 toward the negative direction side of the x axis. A plurality of cutout portions 412a is circumferentially formed at the outer circumferential portion 412 (refer to FIG. 3). Each of the cutout portions 412a is formed so as to extend from an end of the outer circumferential portion 412 in the negative direction of the x axis toward the positive direction side of the x axis. The outer circumferential portion 412 is circumferentially divided into a plurality of pieces by the respective cutout portions 412a.

A plurality of housing engagement portions 413 is circumferentially provided on an outer circumferential surface 412b of the outer circumferential portion 412. The housing engagement portions 413 are located at the end of the outer circumferential portion 412 in the negative direction of the x axis. Each of the housing engagement portions 413 is formed into a substantially trapezoidal shape in vertical cross-section in such a manner that a width of an outer diameter of the outer circumferential portion 412 gradually increases from the positive direction side of the x axis toward the negative direction side of the x axis. Further, a rotational-direction engagement portion 414 is provided on the outer circumferential portion 412b. The rotational-direction engagement portion 414 is disposed along the x axis direction from the end of the outer circumferential portion 412 in the positive direction of the x axis toward the end of the outer circumferential portion 412 in the negative direction of the x axis. The rotational-direction engagement portion 414 is formed into a round bar. The magnetism collection ring holder 41 is fixed at the outer circumferential portion 412 to the torque sensor container portion 22 of the first housing 18.

The welded plate 42 is formed into an annular shape with use of thermoplastic resin. The welded plate 42 is welded to the magnetism collection ring holder 41 by ultrasonic welding while being in abutment with the pair of magnetism collection rings 39 and 40 from the negative direction side of the x axis.

A space in the magnetism collection ring holder 41 that is located on the negative direction side of the x axis with respect to the annular portion 411 and is surrounded by the magnetism collection portions 392 and 402 of the pair of magnetism collection rings 39 and 40, and the welded plate 42 serves as a bottomed Hall IC sensor container portion (a magnetic sensor container portion or a magnetic sensor insertion portion) 45. The Hall element 331 of the Hall IC sensor 33 that is inserted from the opening portion 43 is contained in the Hall IC sensor container portion 45. The Hall IC sensor container portion 45 is filled with an adhesive agent 46. The Hall element 331 is fixed to the first magnetism collection ring 39 and the second magnetism collection ring 40 via the adhesive agent 46.

[First Housing]

Figure 8:
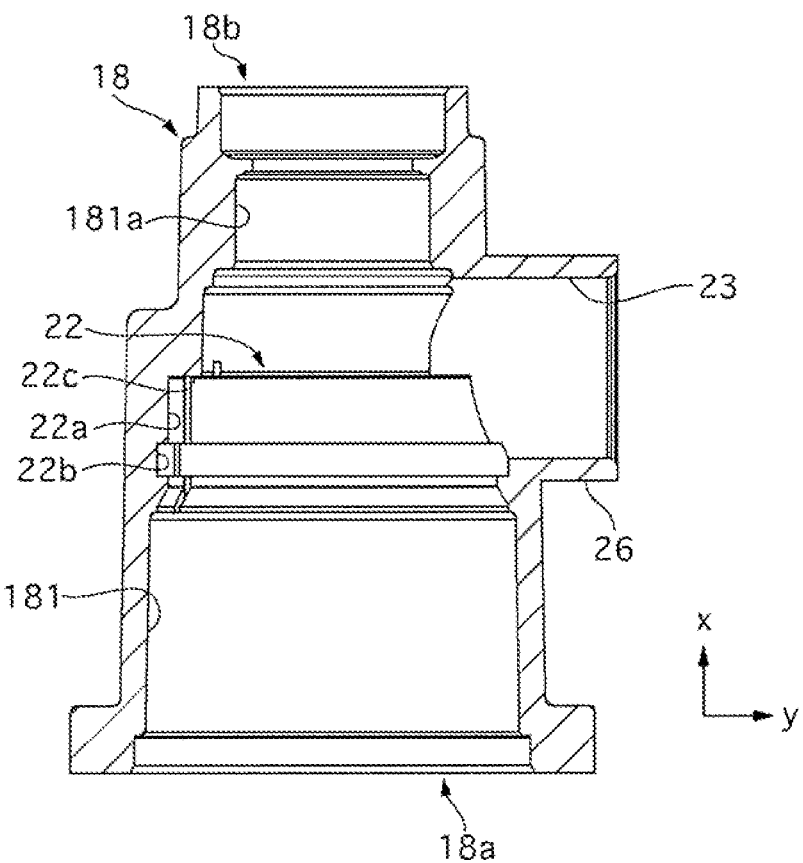
FIG. 8 is a vertical cross-sectional view illustrating the first housing 18 according to the first embodiment.
Figure 9:
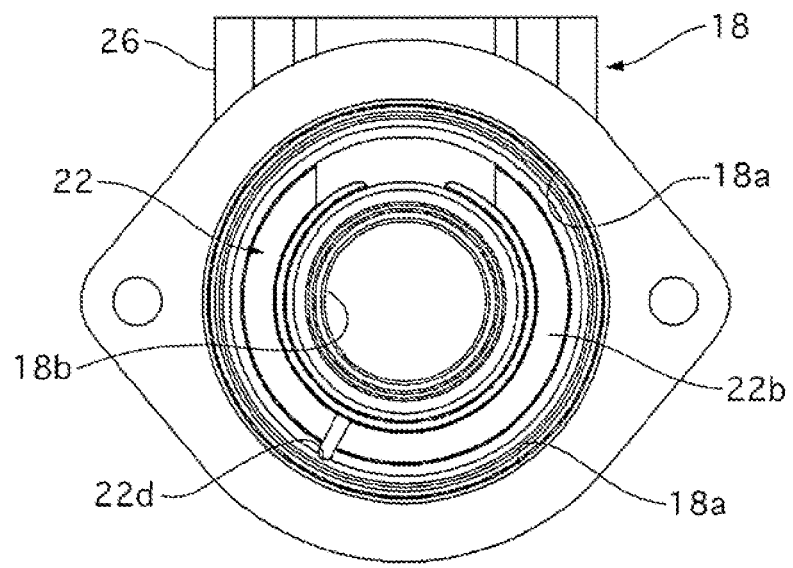
FIG. 9 illustrates the first housing 18 according to the first embodiment as viewed from the negative direction side of the x axis toward the positive direction side of the x axis.

FIG. 8 is a vertical cross-sectional view illustrating the first housing 18 according to the first embodiment. FIG. 9 illustrates the first housing 18 according to the first embodiment as viewed from the negative direction side of the x axis toward the positive direction side of the x axis.

The torque sensor container portion 22 includes a support surface 22a and a housing engagement target portion 22b. The support surface 22a and the housing engagement target portion 22b are provided over the torque sensor container portion 22 except for a portion where the connector insertion hole 23 is connected.

The support surface 22a is in abutment with the outer circumferential surface 412b of the magnetism collection ring holder 41. The magnetism collection ring holder 41 is prevented from being tilted with respect to the first housing 18 (inclined with respect to the rotational axis O) with the aid of the abutment between the outer circumferential surface 412b and the support surface 22a.

The housing engagement target portion 22b is located on the negative direction side of the x axis with respect to the support surface 22a. The housing engagement target portion 22b has a larger outer diameter than the support surface 22a, and the housing engagement portions 413 of the magnetism collection ring holder 41 are engaged therewith. A movement of magnetism collection ring holder 41 relative to the first housing 18 toward the negative direction side of the x axis is limited by engagement between the housing engagement portion 413 and the housing engagement target portion 22b. A movement of the magnetism collection ring holder 41 relative to the first housing 18 toward the positive direction side of the x axis is limited by a stepped surface 22c formed at an end of the torque sensor container portion 22 in the positive direction of the x axis and a substrate mounting portion 47 of the connector 24, which will be described below.

A rotational-direction engagement target portion 22d is provided at the torque sensor container portion 22. The rotational-direction engagement target portion 22*d* is a groove extending in the x axis direction, and is formed in a range from the support surface 22*a* to the housing engagement target portion 22*b*. The rotational-direction engagement portion 414 of the magnetism collection ring holder 41 is engaged with the rotational-direction engagement target portion 22*d*. A rotational position of the magnetism collection ring holder 41 relative to the first housing 18 before the Hall element 313 is inserted in the opening portion 43 is regulated by the engagement between the rotational-direction engagement portion 414 and the rotational-direction engagement target portion 22*d*.

In the first housing 18, a bearing holder portion 181*a*, which holds the needle bearing 20*b*, is provided on the positive direction side of the x axis with respect to the torque sensor container portion 22.

The bearing holder portion 181*a*, the torque sensor container portion 22, the connector mounting portion 26, the connector insertion hole 23, and the first opening portion 18*a* are formed by integrally molding the first housing 18.

[Connector]

Figure 10:
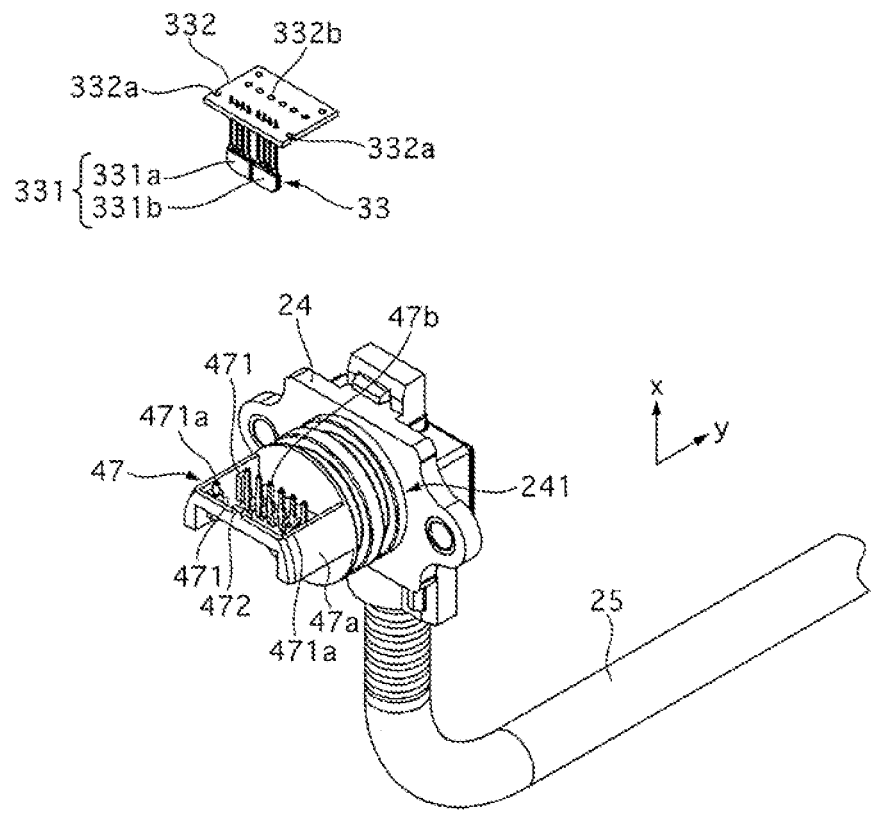
FIG. 10 is an exploded perspective view illustrating a connector 24 according to the first embodiment.
Figure 11:
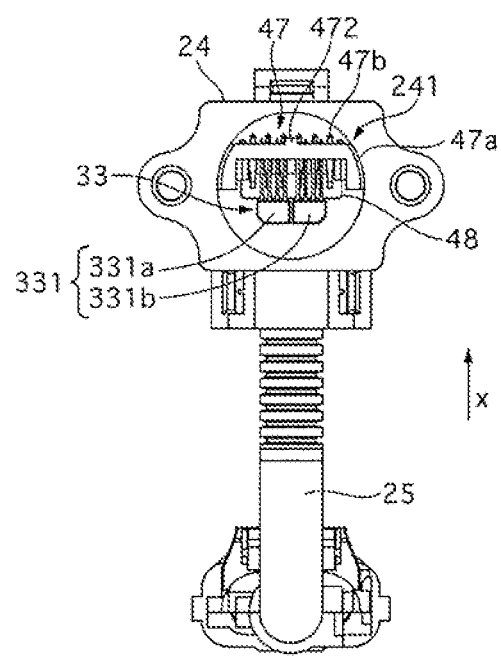
FIG. 11 illustrates the connector 24 according to the first embodiment as viewed from a negative direction side of a y axis toward a positive direction side of the y axis.

FIG. 10 is an exploded perspective view illustrating the connector 24 according to the first embodiment. FIG. 11 illustrates the connector 24 according to the first embodiment as viewed from the negative direction side of the y axis toward the positive direction side of the y axis.

The connector 24 includes a cylindrical portion 241 extending toward the negative direction side of the y axis. A central axis of the cylindrical portion 241 coincides with the central axis of the connector insertion hole 23. The cylindrical portion 241 has an outer diameter that allows the cylindrical portion 241 to be inserted in the connector insertion hole 23. The substrate mounting portion 47 is provided on an end of the cylindrical portion 241 on the negative direction side of the y axis. The substrate mounting portion 47 is formed into such a shape that a cylinder is cut out from both sides in the x axis direction along a plan perpendicular to the x axis. An outer circumferential surface 47*a* of the substrate mounting portion 47 is formed so as to be slightly smaller than an outer diameter of the cylindrical portion 241. A central axis of the substrate mounting portion 47 coincides with the central axis of the connector insertion hole 23. Assume that a virtual circle passing through the outer circumferential surface 47*a* of the substrate mounting portion 47 is set around a point on the central axis of the substrate mounting portion 47 as a center thereof. In this case, the Hall IC sensor 33 is located inside this virtual circle. In other words, the connector insertion hole 23 and the Hall IC sensor 33 are prevented from contacting each other with the aid of the abutment of the outer circumferential surface 47*a* of the substrate mounting portion 47 against the connector insertion hole 23 when the substrate mounting portion 47 is inserted into the connector insertion hole 23.

A rectangular substrate 332 is mounted on the substrate mounting portion 47. The Hall element 331 of the Hall IC sensor 33 is mounted on a surface of the substrate 332 on the negative direction side of the x axis. In the first embodiment, a redundant system of the torque sensor 16 is constructed with use of two Hall elements 331*a* and 331*b* as the Hall element 331. The two Hall elements 331*a* and 331*b* are disposed side by side in a direction orthogonal to the x axis and the y axis. A plurality of terminals 47*b* is provided at the substrate mounting portion 47. The terminals 47*b* are electrically connected to the harness 25. Each of the terminals 47*b* is inserted in a corresponding through-hole 332*b* of the substrate 332. The terminals 47*b* are soldered to the substrate 332, by which the substrate 332 and the harness 25 are electrically connected to each other.

The substrate mounting portion 47 includes four substrate support surfaces 471. Each of the substrate support surfaces 471 is in abutment with a corresponding corner of the substrate 332 from the negative direction side of the x axis. Positioning pins 471*a* are provided on the two substrate support surfaces 471 located on the negative direction side of the y axis among the substrate support surfaces 471. The positioning pins 471*a* are disposed so as to extend from the substrate support surface 471 in the positive direction of the x axis. The positioning pins 471*a* are engaged with positioning grooves 332*a* formed on the substrate 332. The substrate mounting portion 47 includes a substrate holding portion 472. The substrate holding portion 472 is located at an end of the substrate mounting portion 47 in the negative direction of the y axis, and on the positive direction side of the x axis with respect to the substrate 332. A tip of the substrate holding portion 472 is formed into a hook-like shape protruding toward the positive direction side of the y axis with respect to an end of the substrate 332 in the negative direction of the y axis. A predetermined space is generated between the substrate holding portion 472 and the substrate 332 in the x axis direction that corresponds to a thickness direction of the substrate 332. The substrate holding portion 472 abuts against the substrate 332 when the substrate 332 moves by a distance corresponding to this space in the positive direction of the x axis. A movement of the substrate 33 relative to the substrate mounting portion 47 in the positive direction of the x axis is limited by the abutment between the substrate holding portion 472 and the substrate 332.

The substrate mounting portion 47 includes a connector engagement target portion 48. The connector engagement target portion 48 is formed into a plate extending from the substrate mounting portion 47 toward the negative direction side of the x axis. The connector engagement target portion 48 is in abutment with the connector engagement portion 44 of the magnetism collection ring holder 41 from the negative direction side of the y axis when the connector 24 and the torque sensor 16 are mounted in the first housing 18. A movement of the connector 24 relative to the first housing 18 toward the positive direction side of the y axis is limited by the engagement between the connector engagement portion 44 and the connector engagement target portion 48.

Next, a method for detecting a torque by the toque sensor 16 according to the first embodiment will be described.

When no torque is input, centers of the claw portions 351 and 361 in the circumferential direction are located on the boundaries between the poles of the multipolar magnet 30, and permeances to the N poles and the S poles of the multipolar magnet 30 are equal as viewed from the claw portions 351 and 361. Therefore, a magnetic flux generated from the N pole of the multipolar magnet 30 enters the claw portions 351 and 361, and directly enters the S pole of the multipolar magnet 30. Therefore, no magnetic flux flows between the pair of magnetism collection rings 39 and 40, whereby the Hall IC sensor 33 outputs an intermediate voltage.

When a driver rotates the steering wheel 1, the torsion bar 7 is twisted so that a relative angular displacement is generated between the steering shaft body 6 and the pinion shaft 8. This relative angular displacement appears as a relative angular displacement between the claw portions 351 and 361 and the multipolar magnet 30. The generation of the relative angular displacement between the claw portions 351 and 361 and the multipolar magnet 30 leads to a disruption of the balance between the permeances, which causes a magnetic flux generated from the magnetic circuit including the Hall IC sensor 33, i.e., the N pole of the multipolar magnet 30 to flow into one of the claw portions 351 and 361 that faces the N pole at a wider area, and a magnetic flux to flow through the magnetic circuit that returns from one of the claw portions 351 and 361 that faces the S pole at a wider area into the S pole of the multipolar magnet 30 via the pair of magnetism collection rings 39 and 40. At this time, a magnetic flux flowing between the pair of magnetism collection rings 39 and 40 is detected with use of the Hall IC sensor 33, by which the relative angular displacement can be measured and the torque (a steering torque) applied to the torsion bar 7 can be detected.

The torque sensor 16 according to the first embodiment is configured in such a manner that the outer circumferential sides (the radially outer sides) of the pair of the magnetism collection rings 39 and 40 are surrounded by the first annular portion 52 of the first yoke 35. Therefore, an influence of an external magnetic field to which the first yoke 35 is subject is reduced by an air gap between the first yoke 35 and the first magnetism collection ring 39. Therefore, this influence is reduced compared to when the pair of magnetism collection rings 39 and 40 are subject to the influence of the external magnetic field. In other words, the torque sensor 16 according to the first embodiment is configured in such a manner that the first yoke 35 is disposed on the outer circumferences of the pair of magnetism collection rings 39 and 40, thereby allowing the first yoke 35 to function as a shield against the external magnetic field. As a result, the torque sensor 16 according to the first embodiment can reduce the influence of the external magnetic field on the pair of magnetism collection rings 39 and 40, thereby succeeding in improving the accuracy of detecting the steering torque.

Figure 12A:
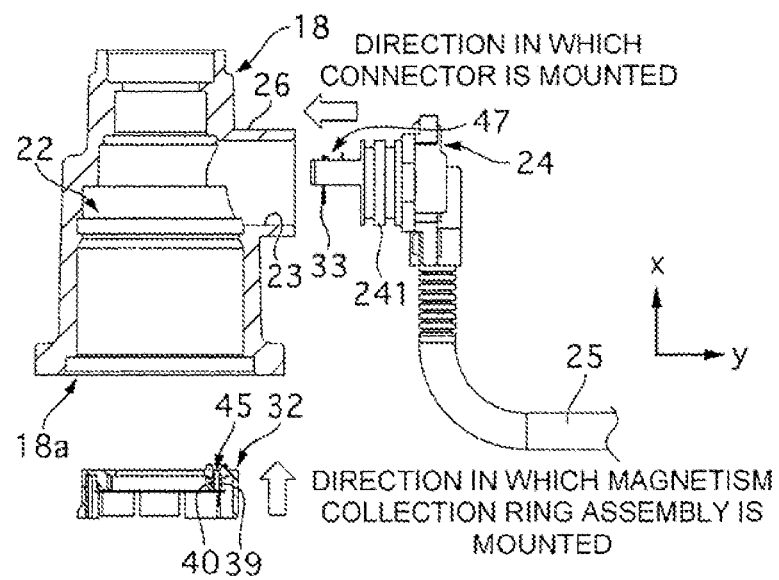
FIGS. 12A, 12B, and 12C illustrate a procedure for mounting the connector 24 and a magnetism collection ring assembly 32 into the first housing 18 according to the first embodiment.
Figure 12B:
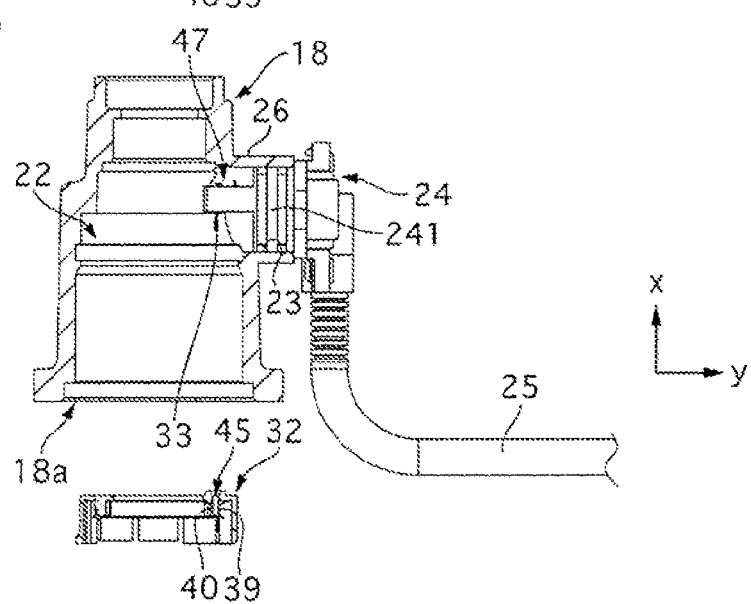
Figure 12C:
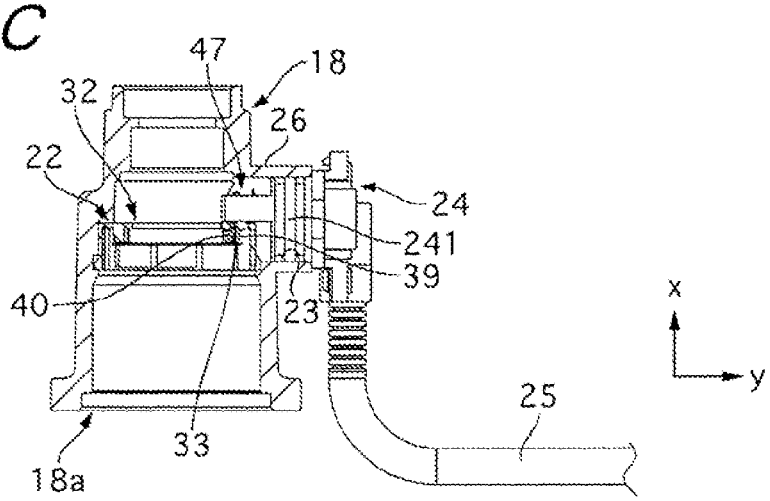

Next, a procedure for mounting the connector 24 and the magnetism collection ring assembly 32 into the first housing 18 will be described. FIGS. 12A, 12B and 12C illustrate the procedure for mounting the connector 24 and the magnetism collection ring assembly 32 into the first housing 18 according to the first embodiment.

(First Step)

The substrate 332 with the Hall IC sensor 33 soldered thereon is set on the substrate mounting portion 47 in the connector 24. Subsequently, the respective terminals 47b on the connector 24 side are soldered onto the substrate 332 to establish an electric connection between the Hall IC sensor 33 and the harness 25. FIG. 12A illustrates the connector 24 with the Hall IC sensor 33 set thereon.

(Second Step)

After completion of the first step, the cylindrical portion 241 of the connector 24 is inserted into the connector insertion hole 23 of the first housing 18 from the positive direction side of the y axis toward the negative direction side of the y axis. FIG. 12B illustrates the connector 24 mounted in the first housing 18.

(Third Step)

After completion of the second step, the adhesive agent 46 is supplied into the bottomed Hall IC sensor container portion 45 in the magnetism collection ring assembly 32 from the opening portion 43. Subsequently, the magnetism collection ring assembly 32 is inserted into the torque sensor container portion 22 from the first opening portion 18a of the first housing 18 in such a manner that the Hall element 331 of the Hall IC sensor 33 is situated in the Hall IC sensor container portion 45. FIG. 12C illustrates the magnetism collection ring assembly 32 mounted in the first housing 18.

After completion of the third step, the Hall IC sensor 33 is fixed to the first magnetism collection ring 39 and the second magnetism collection ring 40 as the adhesive agent 46 is cured.

After completion of the third step, the needle bearing 20b, the yoke assembly 31, the multipolar magnet 30, the ball bearing 20c, and the needle bearing 20d are set on the steering shaft 4. Then, the steering shaft 4 is inserted into the first housing 18 from the first opening portion 18a to be mounted into the housing 18.

As described above, the first embodiment employs such a layout that the magnetism collection portions 392 and 402 of the pair of magnetism collection rings 39 and 40 radially face each other with the aim of reducing the influence of the external magnetic field. Therefore, when being mounted into the first housing 18, the Hall IC sensor 33 should be axially inserted into the space between the magnetism collection portions 392 and 402, to allow the Hall element 331 of the Hall IC sensor 33 to be inserted into the space between the magnetism collection portions 392 and 402.

Therefore, according to the first embodiment, when the connector 24 and the magnetism collection ring assembly 32 are mounted into the first housing 18, first, the Hall IC sensor 33 is set in the connector 24 in such a manner that the Hall IC sensor 33 and the harness 25 are electrically connected to each other (the first step). Subsequently, the connector 24 and the Hall IC sensor 33 are inserted into the first housing 18 from the opening of the connector insertion hole 23 on the positive direction side of the y axis (the second step). Next, the magnetism collection ring assembly 32 is inserted into the torque sensor container portion 22 from the first opening portion 18a in such a manner that the Hall IC sensor 33 is situated between the pair of magnetism collection rings 39 and 40 in the y axis direction (the third step). In other words, an electric connection is established between the Hall IC sensor 33 and the harness 25 in advance, and then the connector 24 is mounted into the first housing 18 and the Hall IC sensor 33 and the magnetism collection ring assembly 32 are set to each other within this first housing 18.

This method allows the Hall IC sensor 33 to be easily inserted into the space between the magnetism collection portions 392 and 402 radially facing each other, thereby succeeding in improving the assemblability of the apparatus while enhancing the robustness against the external magnetic field by placing the first yoke 35 on the outer circumferential sides of the pair of magnetism collection rings 39 and 40.

Further, the Hall IC sensor 33 and the harness 25 do not have to be soldered to each other within the first housing 18. Therefore, this method can improve the assemblability of the apparatus compared to a method that involves the Hall IC sensor and the harness being soldered to each other within the housing. Further, according to the method that involves the Hall IC sensor and the harness being soldered to each other within the housing, this method requires the housing to have a space that allows the soldering work to be carried out within the housing, thereby leading to an increase in the size of the apparatus. According to the first embodiment, the assembling method does not require the housing 18 to have the space that allows the soldering work to be carried out within the housing 18, thereby succeeding in a reduction in the size of the first housing 18.

One possible method for avoiding the electric connection work within the housing is to prepare a connector on the substrate of the Hall IC sensor and connect the Hall IC sensor to the harness via this connector. However, this method requires the substrate to have a space that allows the connector to set thereon, and therefore cannot avoid the increase in the size of the apparatus. On the other hand, according to the first embodiment, the assembling method does not require the substrate 332 to have the connector for the connection to the harness thereon, thereby succeeding in reducing in the size of the first housing 18.

In the above-described manner, the first embodiment has effects that will be listed below.

(1) The power steering apparatus includes:

the steering mechanism 3 including the steering shaft 4 including the steering shaft body 6 configured to rotate according to a steering operation performed on the steering wheel 1, and the pinion shaft 8 connected to the steering shaft body 6 via the torsion bar 7 and configured in such a manner that a rotation of the steering shaft body 6 is transmitted to the pinion shaft 8, and the conversion mechanism 5 configured to convert a rotation of the pinion shaft 8 into turning operations of the steering target wheels 2 and 2;

the gear box housing 17 configured to rotatably support the steering shaft 4, and including the first housing 18 including the first opening portion 18a that is open to the opposite side in the axial direction assuming that the axial direction is the direction along the rotational axis O of the steering shaft 4, and the one side in the axial direction is the steering shaft body 6 side corresponding to the steering shaft body 6 of the steering shaft 4 while the opposite side in the axial direction is the pinion shaft 8 side corresponding to the pinion shaft 8 of the steering shaft 4, and, the second housing 19 including the second opening portion 19a that is open to the one side in the axial direction so as to close the first opening portion 18a;

the torque sensor container portion 22 provided in the first housing 18;

the connector insertion hole 23 provided in the first housing 18 in the radial direction of the rotational axis O, and formed in such a manner that the opposite side in the radial direction is open to the torque sensor container portion 22 while the one side in the radial direction is open to the outer circumferential side of the first housing;

the multipolar magnet 30 disposed on the pinion shaft 8 side and including the N poles and the S poles alternatively arranged in the circumferential direction with the central axis thereof set to the rotational axis O assuming that the circumferential direction is the direction around the rotational axis O;

the first yoke 35 disposed on the steering shaft 6 side, formed from the magnetic material, having the central axis set to the rotational axis O, and including the first claw portions 351 that are the plurality of plate-like members disposed so as to face the multipolar magnet 30 and the cylindrically formed first cylindrical portion 352 connecting the first claw portions 351 to one another;

the second yoke 36 disposed on the steering shaft 6 side, formed from the magnetic material, having the central axis set to the rotational axis O, including the second claw portions 361 that are the plurality of plate-like members disposed so as to face the multipolar magnet 30 and the cylindrically formed second cylindrical portion 362 connecting the second claw portions 361 to one another, and arranged in such a manner that the respective second claw portions 361 are alternatively placed between the respective claw portions of the first claw portions 351 and the second cylindrical portion 362 is located on the inner circumferential side of the first cylindrical portion 352 while the second cylindrical portion 362 and the first cylindrical portion 352 are spaced apart from each other in the radial direction;

the first magnetism collection ring 39 overlapping the first cylindrical portion 352 in the axial direction, disposed between the first cylindrical portion 352 and the second cylindrical portion 362 in the radial direction, formed into the circular arc shape from the magnetic material, and configured to generate a magnetic field therein by receiving a magnetic field generated at the first cylindrical portion 352;

the second magnetism collection ring 40 overlapping the second cylindrical portion 362 in the axial direction, disposed between the second cylindrical portion 362 and the first magnetism collection ring 39 in the radial direction, formed into the circular arc shape from the magnetic material, and configured to generate a magnetic field therein by receiving a magnetic field generated at the second cylindrical portion 362;

the connector 24 inserted from the opposite side of the connector insertion hole 23 in the radial direction toward the one side of the connector insertion hole 23 in the radial direction;

the harness 25 provided at the connector 24 and configured to transmit the electric signal to the motor control circuit 15;

the Hall IC sensor 33 serving as the sensor member, disposed in the connector 24 so as to protrude within the torque sensor container portion 22 toward the first opening portion 18a side, electrically connected to the harness 25 before the connector 24 is inserted from the connector insertion hole 23, disposed so as to be situated between the first magnetism collection ring 39 and the second magnetism collection ring 40 in the radial direction by the insertion of the first magnetism collection ring 39 and the second magnetism collection ring 40 into the torque sensor container portion 22 from the first opening portion 18a after the sensor member is mounted in the first housing 18 together with the connector 24, including the Hall element 331 configured to detect a change in the magnetic field between the first and second magnetism collection rings 39 and 40 that change their respective internal magnetic fields by being affected by the magnetic fields of the first and second cylindrical portions 352 and 362 that change according to a change in the relative angle between the multipolar magnet 30 and the first and second claw portions 351 and 361 that is caused by the torsion of the torsion bar 7, and configured to output the change in the magnetic field to the motor control circuit 15 as the electric signal; and the electric motor 12 configured to be driven and controlled based on the motor control signal calculated by the motor control circuit 15 based on the change in the magnetic field to provide an operation force to the steering mechanism 3.

Therefore, the first embodiment can improve the assemblability of the apparatus.

(2) The power steering apparatus described in the item (1) listed above includes the magnetism collection ring holder 41 disposed in the torque sensor container portion 22, formed with use of the insulating material, and configured to hold the first magnetism collection ring 39 and the second magnetism collection ring 40.

Therefore, the first embodiment can improve the assemblability by mounting the first and second magnetism collection rings 39 and 40 held by the magnetism collection ring holder 41 into the first housing 18, compared to respectively mounting the first and second magnetism collection rings 39 and 40 into the first housing 18.

(3) The power steering apparatus described in the item (2) listed above includes the adhesive agent 46 supplied into between the first and second magnetism collection rings 39 and 40 in the radial direction before the first and second magnetism collection rings 39 and 40 are mounted into the first housing 18 to thereby fix the first and second magnetism collection rings 39 and 40 and the Hall IC sensor 33 to each other when the first and second magnetism collection rings 39 and 40 are mounted in the first housing 18.

Therefore, the first embodiment can improve the performance of holding the Hall IC sensor 33 by the magnetism collection ring holder 41 by fixing the first and second magnetism collection rings 39 and 40 and the Hall IC sensor 33 to each other with use of the adhesive agent 46.

(4) In the power steering apparatus described in the item (3) listed above, the magnetism collection ring holder 41 includes the Hall IC sensor container portion 45 into which the Hall IC sensor 33 is inserted. The Hall IC sensor container portion 45 is formed into the bottomed shape including the opening portion 43 that is open to the one side in the axial direction. The adhesive agent 46 is supplied into the hall IC sensor container portion 45.

Therefore, the flowable adhesive agent 46 is supplied into the bottomed Hall IC sensor container portion 45, which can prevent the adhesive agent 46 from flowing out.

(5) In the power steering apparatus described in the item (4) listed above, the opening portion 43 of the magnetism collection ring holder 41 includes the inclined surfaces 43a formed in such a manner that the opening width gradually reduces from the one side in the axial direction toward the opposite side in the axial direction.

When the magnetism collection ring assembly 32 is inserted into the first housing 18, the work of setting the Hall element 331 should be carried out in a state that makes visual confirmation difficult. At this time, the Hall element 331 is guided into the opening portion 43 by being guided by the inclined surfaces 43a, which can facilitate the insertion of the Hall IC sensor 33 into the opening portion 43.

(6) In the power steering apparatus described in the item (2) listed above, the magnetism collection ring holder 41 includes the connector engagement portion 44. The connector 24 includes the connector engagement target portion 48 configured to be engaged with the connector engagement portion 44 of the magnetism collection ring holder 41 to thereby hold the connector 24 so as to prevent the connector 24 from being pulled out from the connector insertion hole 23.

Therefore, the first embodiment can prevent the Hall IC sensor 33 from being damaged, which otherwise might be caused by the connector 24 being pulled out by mistake.

(7) In the power steering apparatus described in the item (2) listed above, the magnetism collection ring holder 41 includes the housing engagement portion 413. The first housing 18 includes the support surface 22a configured to prevent the magnetism collection ring holder 41 from being tilted with the aid of the abutment of the outer circumferential surface 412b of the magnetism collection ring holder 41 against the support surface 22a, and the housing engagement target portion 22b configured to limit the position of the magnetism collection ring holder 41 in the axial direction with the aid of the engagement of the housing engagement portion 413 with the housing engagement target portion 22b.

Therefore, the first embodiment can improve the performance of holding the magnetism collection ring holder 41 in the torque sensor container portion 22.

(8) In the power steering apparatus described in the item (2) listed above, the magnetism collection ring holder 41 includes the rotational-direction engagement portion 414. The first housing 18 includes the rotational-direction engagement target portion 22d configured to limit a rotation of the magnetism collection ring holder 41 in the circumferential direction within the first housing 18 with the aid of the engagement of the rotational-direction engagement portion 414 of the magnetism collection ring holder 41 with the rotational-direction engagement target portion 22d.

When the magnetism collection ring assembly 32 is inserted into the first housing 18, the work of setting the Hall element 331 should be carried out in the state that makes visual confirmation difficult. At this time, the position of the magnetism collection ring holder 41 in the rotational direction is limited, which can facilitate the insertion of the Hall IC sensor 33 into the opening portion 43.

(9) In the power steering apparatus described in the item (1) listed above, the first housing 18 includes the bearing holding portion 181a provided on the one side in the axial direction with respect to the torque sensor container portion 22 and configured to hold the needle bearing 20b rotatably supporting the steering shaft body 6. Then, the bearing holding portion 181a, the torque sensor container portion 22, the connector insertion hole 23, and the first opening portion 18a are integrally molded.

Therefore, the first housing 18 is integrally molded, which can simplify the apparatus. Further, the first housing 18 including the bearing holding portion 181a is integrally molded, whereby, although the parts of the torques sensor such as the first and second magnetism collection rings 39 and 40 and the Hall IC sensor 33 cannot be inserted from the one side of the first housing 18 in the axial direction, but there are no parts to be mounted in the first housing 18 on the one side in the axial direction with respect to the torque sensor container portion 22 so that the apparatus can be assembled within the integrally molded first housing 18.

(10) The power steering apparatus described in the item (1) listed above includes the substrate 332 disposed in the connector 24 and configured in such a manner that the Hall IC sensor 33 is electrically connected to the substrate 332. The connector 24 includes the substrate mounting portion 47 provided so as to extend in the direction along which the connector 24 is inserted into the connector insertion hole 23, and configured in such a manner that the substrate 332 is set on the substrate mounting portion 47. The substrate mounting portion 47 is formed in such a manner that the connector insertion hole 23 and the Hall IC sensor 33 are prevented from contacting each other with the aid of the abutment between the connector insertion hole 23 and the substrate mounting portion 47 when the substrate mounting portion 47 and the Hall IC sensor 33 are inserted into the connector insertion hole 23.

Therefore, the dimension and the shape of the substrate mounting portion 47 are set in such a manner that the connector insertion hole 23 and the Hall IC sensor 33 are prevented from contacting each other. Accordingly, the Hall IC sensor 33 can be prevented from being damaged, which otherwise might be caused by the Hall IC sensor 33 contacting the connector insertion hole 23 by mistake when the connector 24 is mounted.

(11) The power steering apparatus described in the item (1) listed above includes the substrate 332 disposed in the connector 24 and configured in such a manner that the Hall IC sensor 33 is electrically connected to the substrate 332. The connector 24 includes the substrate mounting portion 47 provided so as to extend in the direction along which the connector 24 is inserted into the connector insertion hole 23, and configured in such a manner that the substrate 332 is set on the substrate mounting portion 47. Assuming that the thickness direction of the substrate 332 is the direction orthogonal to the surface where the Hall IC sensor 33 is connected to the substrate 332, the substrate mounting portion 47 includes the substrate holding portion 472 that limits a movement of the substrate 332 in the thickness direction of the substrate 332, and the substrate holding portion 472 is disposed so as to generate a predetermined space between the substrate holding portion 472 and the substrate 332 in the thickness direction of the substrate 332.

Therefore, the substrate 332 is held at the substrate mounting portion 47 with a predetermined play maintained in the thickness direction, which can absorb a change in the relative position between the members due to a change in the temperature to thereby prevent a stress from being applied to a portion where the Hall IC sensor 33 and the substrate 332 are connected to each other.

(12) The first embodiment provides the method for assembling the power steering apparatus. The power steering apparatus includes:

the steering mechanism 3 including the steering shaft 4 including the steering shaft body 6 configured to rotate according to a steering operation performed on the steering wheel 1, and the pinion shaft 8 connected to the steering shaft body 6 via the torsion bar 7 and configured in such a manner that a rotation of the steering shaft body 6 is transmitted to the pinion shaft 8, and the conversion mechanism 5 configured to convert a rotation of the pinion shaft 8 into turning operations of the steering target wheels 2 and 2;

the gear box housing 17 configured to rotatably support the steering shaft 4, and including the first housing 18 including the first opening portion 18a that is open to the opposite side in the axial direction assuming that the axial direction is the direction along the rotational axis O of the steering shaft 4, and the one side in the axial direction is the steering shaft body 6 side corresponding to the steering shaft body 6 of the steering shaft 4 while the opposite side in the axial direction is the pinion shaft 8 side corresponding to the pinion shaft 8 of the steering shaft 4, and, the second housing 19 including the second opening portion 19a that is open to the one side in the axial direction so as to close the first opening portion 18a;

the torque sensor container portion 22 provided in the first housing 18;

the connector insertion hole 23 provided in the first housing 18 in the radial direction of the rotational axis O, and formed in such a manner that the opposite side in the radial direction is open to the torque sensor container portion 22 while the one side in the radial direction is open to the outer circumferential side of the first housing;

the multipolar magnet 30 disposed on the pinion shaft 8 side and including the N poles and the S poles alternatively arranged in the circumferential direction with the central axis thereof set to the rotational axis O assuming that the circumferential direction is the direction around the rotational axis O;

the first yoke 35 disposed on the steering shaft 6 side, formed from the magnetic material, having the central axis set to the rotational axis O, and including the first claw portions 351 that are the plurality of plate-like members disposed so as to face the multipolar magnet 30 and the cylindrically formed first cylindrical portion 352 connecting the first claw portions 351 to one another;

the second yoke 36 disposed on the steering shaft 6 side, formed from the magnetic material, having the central axis set to the rotational axis O, including the second claw portions 361 that are the plurality of plate-like members disposed so as to face the multipolar magnet 30 and the cylindrically formed second cylindrical portion 362 connecting the second claw portions 361 to one another, and arranged in such a manner that the respective second claw portions 361 are alternatively placed between the respective claw portions of the first claw portions 351 and the second cylindrical portion 362 is located on the inner circumferential side of the first cylindrical portion 352 while the second cylindrical portion 362 and the first cylindrical portion 352 are spaced apart from each other in the radial direction;

the first magnetism collection ring 39 overlapping the first cylindrical portion 352 in the axial direction, disposed between the first cylindrical portion 352 and the second cylindrical portion 362 in the radial direction, formed into the circular arc shape from the magnetic material, and configured to generate a magnetic field therein by receiving a magnetic field generated at the first cylindrical portion 352;

the second magnetism collection ring 40 overlapping the second cylindrical portion 362 in the axial direction, disposed between the second cylindrical portion 362 and the first magnetism collection ring 39 in the radial direction, formed into the circular arc shape from the magnetic material, and configured to generate a magnetic field therein by receiving a magnetic field generated at the second cylindrical portion 362;

the connector 24;

the harness 25 provided at the connector 24 and configured to transmit the electric signal to the motor control circuit 15;

the Hall IC sensor 33 serving as the sensor member, disposed in the connector 24 so as to protrude within the torque sensor container portion 22 toward the first opening portion 18a side, including the Hall element 331 configured to detect a change in the magnetic field between the first and second magnetism collection rings 39 and 40 that change their respective internal magnetic fields by being affected by the magnetic fields of the first and second cylindrical portions 352 and 362 that change according to a change in the relative angle between the multipolar magnet 30 and the first and second claw portions 351 and 361 that is caused by the torsion of the torsion bar 7, and configured to output the change in the magnetic field to the motor control circuit 15 as the electric signal; and the electric motor 12 configured to be driven and controlled based on the motor control signal calculated by the motor control circuit 15 based on the change in the magnetic field to provide an operation force to the steering mechanism 3.

The method for assembling the power steering apparatus includes:

the first step of setting the Hall IC sensor 33 into the connector 24 in such a manner that the Hall IC sensor 33 and the harness 25 are electrically connected to each other;

the second step of inserting the connector 24 and the Hall IC sensor 33 from the opposite side of the connector insertion hole 23 in the radial direction toward the one side of the connector insertion hole 23 in the radial direction as a step performed subsequently to the first step; and the third step of inserting the first magnetism collection ring 39 and the second magnetism collection ring 40 into the torque sensor container portion 22 from the first opening portion 18a in such a manner that the Hall IC sensor 33 is situated between the first magnetism collection ring 39 and the second magnetism collection ring 40 in the radial direction as a step performed subsequently to the second step.

Therefore, the first embodiment can improve the assemblability of the apparatus.

(13) In the method for assembling the power steering apparatus described in the item (12) listed above, the power steering apparatus includes the magnetism collection ring holder 41 disposed in the torque sensor container portion 22, formed with use of the insulating material, and configured to hold the first magnetism collection ring 39 and the second magnetism collection ring 40.

Therefore, the first embodiment can improve the assemblability by mounting the first and second magnetism collection rings 39 and 40 held by the magnetism collection ring holder 41 into the first housing 18, compared to respectively mounting the first and second magnetism collection rings 39 and 40 into the first housing 18.

(14) In the method for assembling the power steering apparatus described in the item (13) listed above, the power steering apparatus includes the adhesive agent 46 supplied into between the first and second magnetism collection rings 39 and 40 in the radial direction before the first and second magnetism collection rings 39 and 40 are mounted into the first housing 18 to thereby fix the first and second magnetism collection rings 39 and 40 and the Hall IC sensor 33 to each other when the first and second magnetism collection rings 39 and 40 are mounted in the first housing 18.

Therefore, the first embodiment can improve the performance of holding the Hall IC sensor 33 by the magnetism collection ring holder 41 by fixing the first and second magnetism collection rings 39 and 40 and the Hall IC sensor 33 to each other with use of the adhesive agent 46.

(15) In the method for assembling the power steering apparatus described in the item (14) listed above, the magnetism collection ring holder 41 includes the Hall IC sensor container portion 45 into which the Hall IC sensor 33 is inserted. The Hall IC sensor container portion 45 is formed into the bottomed shape including the opening portion 43 that is open to the one side in the axial direction. The adhesive agent 46 is supplied into the hall IC sensor container portion 45.

Therefore, the flowable adhesive agent 46 is supplied into the bottomed Hall IC sensor container portion 45, which can prevent the adhesive agent 46 from flowing out.

(16) In the method for assembling the power steering apparatus described in the item (15) listed above, the opening portion 43 of the magnetism collection ring holder 41 includes the inclined surfaces 43a formed in such a manner that the opening width gradually reduces from the one side in the axial direction toward the opposite side in the axial direction.

When the magnetism collection ring assembly 32 is inserted into the first housing 18, the work of setting the Hall element 331 should be carried out in a state that makes visual confirmation difficult. At this time, the Hall element 331 is guided into the opening portion 43 by being guided by the inclined surfaces 43a, which can facilitate the insertion of the Hall IC sensor 33 into the opening portion 43.

(17) In the method for assembling the power steering apparatus described in the item (13) listed above, the magnetism collection ring holder 41 includes the connector engagement portion 44. The connector 24 includes the connector engagement target portion 48 configured to be engaged with the connector engagement portion 44 of the magnetism collection ring holder 41 to thereby hold the connector 24 so as to prevent the connector 24 from being pulled out from the connector insertion hole 23.

Therefore, the first embodiment can prevent the Hall IC sensor 33 from being damaged, which otherwise might be caused by the connector 24 being pulled out by mistake.

When the magnetism collection ring assembly 32 is inserted into the first housing 18, the work of setting the Hall element 331 should be carried out in the state that makes visual confirmation difficult. At this time, the position of the magnetism collection ring holder 41 in the rotational direction is limited, which can facilitate the insertion of the Hall IC sensor 33 into the opening portion 43.

(18) In the method for assembling the power steering apparatus described in the item (12) listed above, the first housing 18 includes the bearing holding portion 181a provided on the one side in the axial direction with respect to the torque sensor container portion 22 and configured to hold the needle bearing 20b rotatably supporting the steering shaft body 6. Then, the bearing holding portion 181a, the torque sensor container portion 22, the connector insertion hole 23, and the first opening portion 18a are integrally molded.

Therefore, the first housing 18 is integrally molded, which can simplify the apparatus. Further, the first housing 18 including the bearing holding portion 181a is integrally molded, whereby, although the parts of the torques sensor such as the first and second magnetism collection rings 39 and 40 and the Hall IC sensor 33 cannot be inserted from the one side of the first housing 18 in the axial direction, but there are no parts to be mounted in the first housing 18 on the one side in the axial direction with respect to the torque sensor container portion 22 so that the apparatus can be assembled within the integrally molded first housing 18.

(19) In the method for assembling the power steering apparatus described in the item (12) listed above, the power steering apparatus includes the substrate 332 disposed in the connector 24 and configured in such a manner that the Hall IC sensor 33 is electrically connected to the substrate 332. The connector 24 includes the substrate mounting portion 47 provided so as to extend in the direction along which the connector 24 is inserted into the connector insertion hole 23, and configured in such a manner that the substrate 332 is set on the substrate mounting portion 47. The substrate mounting portion 47 is formed in such a manner that the connector insertion hole 23 and the Hall IC sensor 33 are prevented from contacting each other with the aid of the abutment between the connector insertion hole 23 and the substrate mounting portion 47 when the substrate mounting portion 47 and the Hall IC sensor 33 are inserted into the connector insertion hole 23.

Therefore, the dimension and the shape of the substrate mounting portion 47 are set in such a manner that the connector insertion hole 23 and the Hall IC sensor 33 are prevented from contacting each other. Accordingly, the Hall IC sensor 33 can be prevented from being damaged, which otherwise might be caused by the Hall IC sensor 33 contacting the connector insertion hole 23 by mistake when the connector 24 is mounted.

(20) In the method for assembling the power steering apparatus described in the item (12) listed above, the power steering apparatus includes the substrate 332 disposed in the connector 24 and configured in such a manner that the Hall IC sensor 33 is electrically connected to the substrate 332. The connector 24 includes the substrate mounting portion 47 provided so as to extend in the direction along which the connector 24 is inserted into the connector insertion hole 23, and configured in such a manner that the substrate 332 is set on the substrate mounting portion 47. Assuming that the thickness direction of the substrate 332 is the direction orthogonal to the surface where the Hall IC sensor 33 is connected to the substrate 332, the substrate mounting portion 47 includes the substrate holding portion 472 that limits a movement of the substrate 332 in the thickness direction of the substrate 332, and the substrate holding portion 472 is disposed so as to generate a predetermined space between the substrate holding portion 472 and the substrate 332 in the thickness direction of the substrate 332.

Therefore, the substrate 332 is held at the substrate mounting portion 47 with a predetermined play maintained in the thickness direction, which can absorb a change in the relative position between the members due to a change in the temperature to thereby prevent a stress from being applied to a portion where the Hall IC sensor 33 and the substrate 332 are connected to each other.

Other Embodiments

Having described how the present exemplary can be carried out based on one exemplary embodiment, the specific configuration of the present invention is not limited to the configuration indicated in the description of the embodiment, and the present invention includes even a modification and the like made without departing from the scope and spirit of the present invention.

For example, the magnetic member may be provided on the input shaft side, and the first and second yoke members may be provided on the output shaft side.

The number of the poles of the magnetic member may be any number as long as the magnetic member includes one or more N pole(s) and one or more S pole(s).

The present invention may be also configured in the following manner.

(1) A power steering apparatus comprises:
a steering mechanism including
a steering shaft including an input shaft configured to rotate according to a steering operation performed on a steering wheel, and an output shaft connected to the input shaft via a torsion bar and configured in such a manner that a rotation of the input shaft is transmitted to the output shaft, and
a conversion mechanism configured to convert a rotation of the output shaft into a turning operation of a steering target wheel;
a housing including
a first housing including a first opening portion that is open to an opposite side in an axial direction assuming that the axial direction is a direction along a rotational axis of the steering shaft, and one side in the axial direction is an input shaft side corresponding to the input shaft of the steering shaft while the opposite side in the axial direction is an output shaft side corresponding to the output shaft of the steering shaft, and,
a second housing including a second opening portion that is open to the one side in the axial direction so as to close the first opening portion,
the housing being configured to rotatably support the steering shaft;
a torque sensor container portion provided in the first housing;
a connector insertion hole provided in the first housing in a radial direction of the rotational axis, and formed in such a manner that one side in the radial direction is open to the torque sensor container portion while an opposite side in the radial direction is open to a outer circumferential side of the first housing;
a magnetic member disposed on one of the input shaft side and the output shaft side concentrically with the rotational axis of the steering shaft, and including an N pole and an S pole alternatively arranged in a circumferential direction, assuming that the circumferential direction is a direction around the rotational axis of the steering shaft;
a first yoke member disposed on the other of the input shaft side and the output shaft side, formed from a magnetic material, located concentrically with the rotational axis of the steering shaft, and including first claw portions that are a plurality of plate-like members disposed so as to face the magnetic member and a cylindrically formed first cylindrical portion connecting the first claw portions to one another;
a second yoke disposed on the other of the input shaft side and the output shaft side, formed from a magnetic material, located concentrically with the rotational axis of the steering shaft, including second claw portions that are a plurality of plate-like members disposed so as to face the magnetic member and a cylindrically formed second cylindrical portion connecting the second claw portions to one another, and arranged in such a manner that the respective second claw portions are alternatively placed between respective claw portions of the first claw portions and the second cylindrical portion is located on an inner circumferential side of the first cylindrical portion while the second cylindrical portion and the first cylindrical portion are spaced apart from each other in the radial direction;
a first magnetism collection ring overlapping the first cylindrical portion in the axial direction, disposed between the first cylindrical portion and the second cylindrical portion in the radial direction, formed into a circular arc shape from a magnetic material, and configured to generate a magnetic field therein by receiving a magnetic field generated at the first cylindrical portion;
a second magnetism collection ring overlapping the second cylindrical portion in the axial direction, disposed between the second cylindrical portion and the first magnetism collection ring in the radial direction, formed into a circular arc shape from a magnetic material, and configured to generate a magnetic field therein by receiving a magnetic field generated at the second cylindrical portion;
a connector inserted from an opposite side of the connector insertion hole in the radial direction toward one side of the connector insertion hole in the radial direction;
a harness provided at the connector and configured to transmit an electric signal to a controller;
a magnetic sensor serving as a sensor member, disposed in the connector so as to protrude within the torque sensor container portion toward a first opening portion side, electrically connected to the harness before the connector is inserted from the connector insertion hole, disposed so as to be situated between the first magnetism collection ring and the second magnetism collection ring in the radial direction by insertion of the first magnetism collection ring and the second magnetism collection ring into the torque sensor container portion from the first opening portion after the sensor member is mounted in the first housing together with the connector, including a Hall element configured to detect a change in a magnetic field between the first and second magnetism collection rings that change their respective internal magnetic fields by being affected by magnetic fields of the first and second cylindrical portions that change according to a change in a relative angle between the magnetic member and the first and second claw portions that is caused by a torsion of the torsion bar, and configured to output the change in the magnetic field to the controller as the electric signal; and an electric motor configured to be driven and controlled based on a motor control signal calculated by the controller based on the change in the magnetic field to provide an operation force to the steering mechanism.

According to this configuration, outer circumferential sides of the magnetism collection rings are surrounded by the first cylindrical portion of the first yoke member, which can reduce an influence of an external magnetic field on the magnetism collection rings. An influence of an external magnetic field to which the first yoke member is subject is reduced by an air gap between the first yoke member and the first magnetism collection ring, whereby this influence is small compared to when the magnetism collection rings are subject to the influence of the external magnetic field. Further, the apparatus configured in the above-described manner allows the magnetic sensor to be electrically connected in advance, and then be mounted in the first housing to be set to the first and magnetism collection rings within this first housing, which can improve the assemblability of the apparatus compared to a method that involves electrically connecting the magnetic sensor such as soldering the magnetic sensor within the first housing.

(2) The power steering apparatus according to the item (1) may further comprise a magnetism collection ring holding member disposed in the torque sensor container portion, formed with use of an insulating material, and configured to hold the first magnetism collection ring and the second magnetism collection ring.

According to this configuration, the first and second magnetism collection rings are mounted into the first housing while being held by the magnetism collection ring holding member, which can improve the assemblability compared to respectively mounting the first and second magnetism collection rings into the first housing.

(3) The power steering apparatus according to the item (2) may further comprise an adhesive agent supplied into between the first and second magnetism collection rings in the radial direction before the first and second magnetism collection rings are mounted into the first housing to thereby fix the first and second magnetism collection rings and the magnetic sensor to each other when the first and second magnetism collection rings are mounted in the first housing.

According to this configuration, the first and second magnetism collection rings and the magnetic sensor are fixed to each other with use of the adhesive agent, which can improve the performance of holding the magnetic sensor.

(4) In the power steering apparatus according to the item 3, the magnetism collection ring holding member may include a magnetic sensor insertion portion into which the magnetic sensor is inserted. The magnetic sensor insertion portion may be formed into a bottomed shape including an opening portion that is open to the one side in the axial direction. The adhesive agent may be supplied into the magnetic sensor insertion portion.

According to this configuration, the flowable adhesive agent is supplied into the bottomed magnetic sensor container portion, which can prevent the adhesive agent from flowing out.

(5) In the power steering apparatus according to the item (2), an opening portion of the magnetism collection ring holding member may include an inclined surface formed in such a manner that an opening width gradually reduces from the one side in the axial direction toward the opposite side in the axial direction.

According to this configuration, the insertion of the magnetic sensor can be facilitated.

(6) In the power steering apparatus according to the item (2), the magnetism collection ring holding member may include a connector engagement portion. The connector may include a connector engagement target portion configured to be engaged with the connector engagement portion of the magnetism collection ring holding member to thereby hold the connector so as to prevent the connector from being pulled out from the connector insertion hole.

According to this configuration, the magnetic sensor can be prevented from being damaged, which otherwise might be caused by the connector being pulled out by mistake.

(7) In the power steering apparatus according to the item (2), the magnetism collection ring holding member may include a housing engagement portion. The first housing may include a support surface configured to prevent the magnetism collection ring holding member from being tilted with the aid of abutment of an outer circumferential surface of the magnetism collection ring holding member against the support surface, and a housing engagement target portion configured to limit a position of the magnetism collection ring holding member in the axial direction with the aid of engagement of the housing engagement portion with the housing engagement target portion.

According to this configuration, the performance of holding the magnetism collection ring holding member can be improved (8) In the power steering apparatus according to the item (2), the magnetism collection ring holding member may include a rotational-direction engagement portion. The first housing may include a rotational-direction engagement target portion configured to limit a rotation of the magnetism collection ring holding member in a circumferential direction within the first housing with the aid of engagement of the rotational-direction engagement portion of the magnetism collection ring holding member with the rotational-direction engagement target portion.

According to this configuration, a position of the magnetism collection ring holding member in a rotational direction can be limited.

(9) The power steering apparatus according to the item (1), the first housing may include a bearing holding portion provided on the one side in the axial direction with respect to the torque sensor container portion and configured to hold a bearing rotatably supporting the input shaft. The bearing holding portion, the torque sensor container portion, the connector insertion hole, and the first opening portion may be integrally molded.

According to this configuration, the first housing is integrally molded, which can simplify the apparatus. Further, the first housing including the bearing holding portion is integrally molded, whereby, although the parts of the torques sensor such as the first and second magnetism collection rings and the magnetic sensor cannot be inserted from the one side of the first housing in the axial direction, the employment of the above-described configuration allows the apparatus to be assembled within the integrally molded first housing.

(10) The power steering apparatus according to the item (1) may further comprise a substrate disposed in the connector and configured in such a manner that the magnetic sensor is electrically connected to the substrate. The connector may include a substrate mounting portion provided so as to extend in a direction along which the connector is inserted into the connector insertion hole, and configured in such a manner that the substrate is set on the substrate mounting portion. The substrate mounting portion may be formed in such a manner that the connector insertion hole and the magnetic sensor are prevented from contacting each other with the aid of abutment between the connector insertion hole and the substrate mounting portion when the substrate mounting portion and the magnetic sensor are inserted into the connector insertion hole.

The dimension and the shape of the substrate mounting portion are set in such a manner that the connector insertion hole and the magnetic sensor are prevented from contacting each other. Therefore, the magnetic sensor can be prevented from being damaged, which otherwise might be caused by the magnetic sensor contacting the connector insertion hole by mistake when the connector is mounted.

(11) The power steering apparatus according to the item (1) may further comprise a substrate disposed in the connector and configured in such a manner that the magnetic sensor is electrically connected to the substrate. The connector may include a substrate mounting portion provided so as to extend in a direction along which the connector is inserted into the connector insertion hole, and configured in such a manner that the substrate is set on the substrate mounting portion. The substrate mounting portion may include a substrate holding portion that limits a movement of the substrate in a thickness direction of the substrate, assuming that the thickness direction of the substrate is a direction orthogonal to a surface where the magnetic sensor is connected to the substrate. The substrate holding portion may be disposed so as to generate a predetermined space between the substrate holding portion and the substrate in the thickness direction of the substrate.

The substrate is held at the substrate mounting portion 47 with a predetermined play maintained, which can absorb a change in a relative position between the members due to a change in the temperature to thereby prevent a stress from being applied to a portion where the magnetic sensor and the substrate are connected to each other.

(12) One aspect of the present invention is a method for assembling a power steering apparatus. The power steering apparatus comprises:

a steering mechanism including a steering shaft including an input shaft configured to rotate according to a steering operation performed on a steering wheel, and an output shaft connected to the input shaft via a torsion bar and configured in such a manner that a rotation of the input shaft is transmitted to the output shaft, and a conversion mechanism configured to convert a rotation of the output shaft into a turning operation of a steering target wheel;

a housing including a first housing including a first opening portion that is open to an opposite side in an axial direction assuming that the axial direction is a direction along a rotational axis of the steering shaft, and one side in the axial direction is an input shaft side corresponding to the input shaft of the steering shaft while the opposite side in the axial direction is an output shaft side corresponding to the output shaft of the steering shaft, and, a second housing including a second opening portion that is open to the one side in the axial direction so as to close the first opening portion, the housing being configured to rotatably support the steering shaft;

a torque sensor container portion provided in the first housing;

a connector insertion hole provided in the first housing in a radial direction of the rotational axis, and formed in such a manner that one side in the radial direction is open to the torque sensor container portion while an opposite side in the radial direction is open to a outer circumferential side of the first housing;

a magnetic member disposed on one of the input shaft side and the output shaft side concentrically with the rotational axis of the steering shaft, and including an N pole and an S pole alternatively arranged in a circumferential direction, assuming that the circumferential direction is a direction around the rotational axis of the steering shaft;

a first yoke member disposed on the other of the input shaft side and the output shaft side, formed from a magnetic material, located concentrically with the rotational axis of the steering shaft, and including first claw portions that are a plurality of plate-like members disposed so as to face the magnetic member and a cylindrically formed first cylindrical portion connecting the first claw portions to one another;

a second yoke disposed on the other of the input shaft side and the output shaft side, formed from a magnetic material, located concentrically with the rotational axis of the steering shaft, including second claw portions that are a plurality of plate-like members disposed so as to face the magnetic member and a cylindrically formed second cylindrical portion connecting the second claw portions to one another, and arranged in such a manner that the respective second claw portions are alternatively placed between respective claw portions of the first claw portions and the second cylindrical portion is located on an inner circumferential side of the first cylindrical portion while the second cylindrical portion and the first cylindrical portion are spaced apart from each other in the radial direction;

a first magnetism collection ring overlapping the first cylindrical portion in the axial direction, disposed between the first cylindrical portion and the second cylindrical portion in the radial direction, formed into a circular arc shape from a magnetic material, and configured to generate a magnetic field therein by receiving a magnetic field generated at the first cylindrical portion;

a second magnetism collection ring overlapping the second cylindrical portion in the axial direction, disposed between the second cylindrical portion and the first magnetism collection ring in the radial direction, formed into a circular arc shape from a magnetic material, and configured to generate a magnetic field therein by receiving a magnetic field generated at the second cylindrical portion;

a connector;

a harness provided at the connector and configured to transmit an electric signal to a controller;

a magnetic sensor serving as a sensor member, disposed in the connector so as to protrude within the torque sensor container portion toward a first opening portion side, including a Hall element configured to detect a change in a magnetic field between the first and second magnetism collection rings that change their respective internal magnetic fields by being affected by magnetic fields of the first and second cylindrical portions that change according to a change in a relative angle between the magnetic member and the first and second claw portions that is caused by a torsion of the torsion bar, and configured to output the change in the magnetic field to the controller as the electric signal; and an electric motor configured to be driven and controlled based on a motor control signal calculated by the controller based on the change in the magnetic field to provide an operation force to the steering mechanism. The method for assembling the power steering apparatus comprises:

a first step of setting the magnetic sensor into the connector in such a manner that the magnetic sensor and the harness are electrically connected to each other;

a second step of inserting the connector and the magnetic sensor from an opposite side of the connector insertion hole in the radial direction toward one side of the connector insertion hole in the radial direction as a step performed subsequently to the first step; and a third step of inserting the first magnetism collection ring and the second magnetism collection ring into the torque sensor container portion from the first opening portion in such a manner that the magnetic sensor is situated between the first magnetism collection ring and the second magnetism collection ring in the radial direction as a step performed subsequently to the second step.

According to this configuration, outer circumferential sides of the magnetism collection rings are surrounded by the first cylindrical portion of the first yoke member, which can reduce an influence of an external magnetic field on the magnetism collection rings. An influence of an external magnetic field to which the first yoke member is subject is reduced by an air gap between the first yoke member and the first magnetism collection ring, whereby this influence is small compared to when the magnetism collection rings are subject to the influence of the external magnetic field. Further, the apparatus configured in the above-described manner allows the magnetic sensor to be electrically connected in advance, and then be mounted in the first housing to be set to the first and magnetism collection rings within this first housing, which can improve the assemblability of the apparatus compared to a method that involves electrically connecting the magnetic sensor such as soldering the magnetic sensor within the first housing.

(13) In the method for assembling the power steering apparatus according to the item (12), the power steering apparatus may further comprise a magnetism collection ring holding member disposed in the torque sensor container portion, formed with use of an insulating material, and configured to hold the first magnetism collection ring and the second magnetism collection ring.

According to this configuration, the first and second magnetism collection rings are mounted into the first housing while being held by the magnetism collection ring holding member, which can improve the assemblability compared to respectively mounting the first and second magnetism collection rings into the first housing.

(14) In the method for assembling the power steering apparatus according to the item (13), the power steering apparatus may further comprise an adhesive agent supplied into between the first and second magnetism collection rings in the radial direction before the first and second magnetism collection rings are mounted into the first housing to thereby fix the first and second magnetism collection rings and the magnetic sensor to each other when the first and second magnetism collection rings are mounted in the first housing.

According to this configuration, the first and second magnetism collection rings and the magnetic sensor are fixed to each other with use of the adhesive agent, which can improve the performance of holding the magnetic sensor.

(15) In the method for assembling the power steering apparatus according to the item (14), the magnetism collection ring holding member may include a magnetic sensor insertion portion into which the magnetic sensor is inserted. The magnetic sensor insertion portion may be formed into a bottomed shape including an opening portion that is open to the one side in the axial direction. The adhesive agent may be supplied into the magnetic sensor insertion portion.

According to this configuration, the flowable adhesive agent is supplied into the bottomed magnetic sensor container portion, which can prevent the adhesive agent from flowing out.

(16) In the method for assembling the power steering apparatus according to the item (13), an opening portion of the magnetism collection ring holding member may include an inclined surface formed in such a manner that an opening width gradually reduces from the one side in the axial direction toward the opposite side in the axial direction.

According to this configuration, the insertion of the magnetic sensor can be facilitated.

(17) In the method for assembling the power steering apparatus according to the item (13), the magnetism collection ring holding member may include a connector engagement portion. The connector may include a connector engagement target portion configured to be engaged with the connector engagement portion of the magnetism collection ring holding member to thereby hold the connector so as to prevent the connector from being pulled out from the connector insertion hole.

According to this configuration, the magnetic sensor can be prevented from being damaged, which otherwise might be caused by the connector being pulled out by mistake.

(18) In the method for assembling the power steering apparatus according to the item (12), the first housing may include a bearing holding portion provided on the one side in the axial direction with respect to the torque sensor container portion and configured to hold a bearing rotatably supporting the input shaft. The bearing holding portion, the torque sensor container portion, the connector insertion hole, and the first opening portion may be integrally molded.

According to this configuration, the first housing is integrally molded, which can simplify the apparatus. Further, the first housing including the bearing holding portion is integrally molded, whereby, although the parts of the torques sensor such as the first and second magnetism collection rings and the magnetic sensor cannot be inserted from the one side of the first housing in the axial direction, the employment of the above-described configuration allows the apparatus to be assembled within the integrally molded first housing.

(19) In the method for assembling the power steering apparatus according to the item (12), the power steering apparatus may further comprise a substrate disposed in the connector and configured in such a manner that the magnetic sensor is electrically connected to the substrate. The connector may include a substrate mounting portion provided so as to extend in a direction along which the connector is inserted into the connector insertion hole, and configured in such a manner that the substrate is set on the substrate mounting portion. The substrate mounting portion may be formed in such a manner that the connector insertion hole and the magnetic sensor are prevented from contacting each other with the aid of abutment between the connector insertion hole and the substrate mounting portion when the substrate mounting portion and the magnetic sensor are inserted into the connector insertion hole.

The dimension and the shape of the substrate mounting portion are set in such a manner that the connector insertion hole and the magnetic sensor are prevented from contacting each other. Therefore, the magnetic sensor can be prevented from being damaged, which otherwise might be caused by the magnetic sensor contacting the connector insertion hole by mistake when the connector is mounted.

(20) In the method for assembling the power steering apparatus according to the item (12), the power steering apparatus may further comprise a substrate disposed in the connector and configured in such a manner that the magnetic sensor is electrically connected to the substrate. The connector may include a substrate mounting portion provided so as to extend in a direction along which the connector is inserted into the connector insertion hole, and configured in such a manner that the substrate is set on the substrate mounting portion. The substrate mounting portion may include a substrate holding portion that limits a movement of the substrate in a thickness direction of the substrate, assuming that the thickness direction of the substrate is a direction orthogonal to a surface where the magnetic sensor is connected to the substrate. The substrate holding portion may be disposed so as to generate a predetermined space between the substrate holding portion and the substrate in the thickness direction of the substrate.

The substrate is held at the substrate mounting portion 47 with a predetermined play maintained, which can absorb a change in a relative position between the members due to a change in the temperature to thereby prevent a stress from being applied to a portion where the magnetic sensor and the substrate are connected to each other.

Therefore, according to the present invention, the assemblability of the apparatus can be improved.

The above-described respective embodiments can be arbitrarily combined.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Applications No. 2014-190975 filed on Sep. 19, 2014.

The entire disclosure of Japanese Patent Application No. 2014-190975 filed on Sep. 19, 2014 including specification, claims, drawings and summary are incorporated herein by reference in its entirety.

What is claimed is:
1. A power steering apparatus comprising:
a steering mechanism including
a steering shaft including an input shaft configured to rotate according to a steering operation performed on a steering wheel, and an output shaft connected to the input shaft via a torsion bar and configured in such a manner that a rotation of the input shaft is transmitted to the output shaft, and
a conversion mechanism configured to convert a rotation of the output shaft into a turning operation of a steering target wheel;
a housing including
a first housing including a first opening portion that is open to an opposite side in an axial direction assuming that the axial direction is a direction along a rotational axis of the steering shaft, and one side in the axial direction is an input shaft side corresponding to the input shaft of the steering shaft while the opposite side in the axial direction is an output shaft side corresponding to the output shaft of the steering shaft, and
a second housing including a second opening portion that is open to the one side in the axial direction so as to close the first opening portion,
the housing being configured to rotatably support the steering shaft;
a torque sensor container portion provided in the first housing;
a connector insertion hole provided in the first housing in a radial direction of the rotational axis, and formed in such a manner that one side in the radial direction is open to the torque sensor container portion while an opposite side in the radial direction is open to an outer circumferential side of the first housing;
a magnetic member disposed on one of the input shaft side and the output shaft side concentrically with the rotational axis of the steering shaft, and including an N pole and an S pole alternatively arranged in a circumferential direction, assuming that the circumferential direction is a direction around the rotational axis of the steering shaft;
a first yoke member disposed on the other of the input shaft side and the output shaft side, formed from a magnetic material, located concentrically with the rotational axis of the steering shaft, and including first claw portions that are a plurality of plate members disposed so as to face the magnetic member and a cylindrically formed first cylindrical portion connecting the first claw portions to one another;
a second yoke disposed on the other of the input shaft side and the output shaft side, formed from a magnetic material, located concentrically with the rotational axis of the steering shaft, including second claw portions that are a plurality of plate members disposed so as to face the magnetic member and a cylindrically formed second cylindrical portion connecting the second claw portions to one another, and arranged in such a manner that the respective second claw portions are alternatively placed between respective claw portions of the first claw portions and the second cylindrical portion is located on an inner circumferential side of the first cylindrical portion while the second cylindrical portion and the first cylindrical portion are spaced apart from each other in the radial direction;
a first magnetism collection ring overlapping the first cylindrical portion in the axial direction, disposed between the first cylindrical portion and the second cylindrical portion in the radial direction, formed into a circular arc shape from a magnetic material, and configured to generate a magnetic field therein by receiving a magnetic field generated at the first cylindrical portion;
a second magnetism collection ring overlapping the second cylindrical portion in the axial direction, disposed between the second cylindrical portion and the first magnetism collection ring in the radial direction, formed into a circular arc shape from a magnetic material, and configured to generate a magnetic field therein by receiving a magnetic field generated at the second cylindrical portion;
a connector inserted from an opposite side of the connector insertion hole in the radial direction toward one side of the connector insertion hole in the radial direction;
a harness provided at the connector and configured to transmit an electric signal to a controller;
a magnetic sensor serving as a sensor member, disposed in the connector so as to protrude within the torque sensor container portion toward a first opening portion side, electrically connected to the harness before the connector is inserted from the connector insertion hole, disposed so as to be situated between the first magnetism collection ring and the second magnetism collection ring in the radial direction by insertion of the first magnetism collection ring and the second magnetism collection ring into the torque sensor container portion from the first opening portion after the sensor member is mounted in the first housing together with the connector, including a Hall element configured to detect a change in a magnetic field between the first and second magnetism collection rings that change their respective internal magnetic fields by being affected by magnetic fields of the first and second cylindrical portions that change according to a change in a relative angle between the magnetic member and the first and second claw portions that is caused by a torsion of the torsion bar, and configured to output the change in the magnetic field to the controller as the electric signal; and an electric motor configured to be driven and controlled based on a motor control signal calculated by the controller based on the change in the magnetic field to provide an operation force to the steering mechanism.

2. The power steering apparatus according to claim 1, further comprising a magnetism collection ring holding member disposed in the torque sensor container portion, formed with use of an insulating material, and configured to hold the first magnetism collection ring and the second magnetism collection ring.

3. The power steering apparatus according to claim 2, further comprising an adhesive agent supplied into between the first and second magnetism collection rings in the radial direction before the first and second magnetism collection rings are mounted into the first housing to thereby fix the first and second magnetism collection rings and the magnetic sensor to each other when the first and second magnetism collection rings are mounted in the first housing.

4. The power steering apparatus according to claim 3, wherein the magnetism collection ring holding member includes a magnetic sensor insertion portion into which the magnetic sensor is inserted, wherein the magnetic sensor insertion portion is formed into a bottomed shape including an opening portion that is open to the one side in the axial direction, and wherein the adhesive agent is supplied into the magnetic sensor insertion portion.

5. The power steering apparatus according to claim 2, wherein an opening portion of the magnetism collection ring holding member includes an inclined surface formed in such a manner that an opening width gradually reduces from the one side in the axial direction toward the opposite side in the axial direction.

6. The power steering apparatus according to claim 2, wherein the magnetism collection ring holding member includes a connector engagement portion, and wherein the connector includes a connector engagement target portion configured to be engaged with the connector engagement portion of the magnetism collection ring holding member to thereby hold the connector so as to prevent the connector from being pulled out from the connector insertion hole.

7. The power steering apparatus according to claim 2, wherein the magnetism collection ring holding member includes a housing engagement portion, and wherein the first housing includes a support surface configured to prevent the magnetism collection ring holding member from being tilted with an aid of abutment of an outer circumferential surface of the magnetism collection ring holding member against the support surface, and a housing engagement target portion configured to limit a position of the magnetism collection ring holding member in the axial direction with an aid of engagement of the housing engagement portion with the housing engagement target portion.

8. The power steering apparatus according to claim 2, wherein the magnetism collection ring holding member includes a rotational-direction engagement portion, and wherein the first housing includes a rotational-direction engagement target portion configured to limit a rotation of the magnetism collection ring holding member in a circumferential direction within the first housing with an aid of engagement of the rotational-direction engagement portion of the magnetism collection ring holding member with the rotational-direction engagement target portion.

9. The power steering apparatus according to claim 1, wherein the first housing includes a bearing holding portion provided on the one side in the axial direction with respect to the torque sensor container portion and configured to hold a bearing rotatably supporting the input shaft, and wherein the bearing holding portion, the torque sensor container portion, the connector insertion hole, and the first opening portion are integrally molded.

10. The power steering apparatus according to claim 1, further comprising a substrate disposed in the connector and configured in such a manner that the magnetic sensor is electrically connected to the substrate, wherein the connector includes a substrate mounting portion provided so as to extend in a direction along which the connector is inserted into the connector insertion hole, and configured in such a manner that the substrate is set on the substrate mounting portion, and wherein the substrate mounting portion is formed in such a manner that the connector insertion hole and the magnetic sensor are prevented from contacting each other with an aid of abutment between the connector insertion hole and the substrate mounting portion when the substrate mounting portion and the magnetic sensor are inserted into the connector insertion hole.

11. The power steering apparatus according to claim 1, further comprising a substrate disposed in the connector and configured in such a manner that the magnetic sensor is electrically connected to the substrate, wherein the connector includes a substrate mounting portion provided so as to extend in a direction along which the connector is inserted into the connector insertion hole, and configured in such a manner that the substrate is set on the substrate mounting portion, wherein the substrate mounting portion includes a substrate holding portion that limits a movement of the substrate in a thickness direction of the substrate, assuming that the thickness direction of the substrate is a direction orthogonal to a surface where the magnetic sensor is connected to the substrate, and wherein the substrate holding portion is disposed so as to generate a predetermined space between the substrate holding portion and the substrate in the thickness direction of the substrate.

12. A method for assembling a power steering apparatus, the power steering apparatus comprising:

a steering mechanism including a steering shaft including an input shaft configured to rotate according to a steering operation performed on a steering wheel, and an output shaft connected to the input shaft via a torsion bar and configured in such a manner that a rotation of the input shaft is transmitted to the output shaft, and a conversion mechanism configured to convert a rotation of the output shaft into a turning operation of a steering target wheel;
a housing including
a first housing including a first opening portion that is open to an opposite side in an axial direction assuming that the axial direction is a direction along a rotational axis of the steering shaft, and one side in the axial direction is an input shaft side corresponding to the input shaft of the steering shaft while the opposite side in the axial direction is an output shaft side corresponding to the output shaft of the steering shaft, and
a second housing including a second opening portion that is open to the one side in the axial direction so as to close the first opening portion,
the housing being configured to rotatably support the steering shaft;
a torque sensor container portion provided in the first housing;
a connector insertion hole provided in the first housing in a radial direction of the rotational axis, and formed in such a manner that one side in the radial direction is open to the torque sensor container portion while an opposite side in the radial direction is open to an outer circumferential side of the first housing;
a magnetic member disposed on one of the input shaft side and the output shaft side concentrically with the rotational axis of the steering shaft, and including an N pole and an S pole alternatively arranged in a circumferential direction, assuming that the circumferential direction is a direction around the rotational axis of the steering shaft;
a first yoke member disposed on the other of the input shaft side and the output shaft side, formed from a magnetic material, located concentrically with the rotational axis of the steering shaft, and including first claw portions that are a plurality of plate members disposed so as to face the magnetic member and a cylindrically formed first cylindrical portion connecting the first claw portions to one another;
a second yoke disposed on the other of the input shaft side and the output shaft side, formed from a magnetic material, located concentrically with the rotational axis of the steering shaft, including second claw portions that are a plurality of plate members disposed so as to face the magnetic member and a cylindrically formed second cylindrical portion connecting the second claw portions to one another, and arranged in such a manner that the respective second claw portions are alternatively placed between respective claw portions of the first claw portions and the second cylindrical portion is located on an inner circumferential side of the first cylindrical portion while the second cylindrical portion and the first cylindrical portion are spaced apart from each other in the radial direction;
a first magnetism collection ring overlapping the first cylindrical portion in the axial direction, disposed between the first cylindrical portion and the second cylindrical portion in the radial direction, formed into a circular arc shape from a magnetic material, and configured to generate a magnetic field therein by receiving a magnetic field generated at the first cylindrical portion;
a second magnetism collection ring overlapping the second cylindrical portion in the axial direction, disposed between the second cylindrical portion and the first magnetism collection ring in the radial direction, formed into a circular arc shape from a magnetic material, and configured to generate a magnetic field therein by receiving a magnetic field generated at the second cylindrical portion;
a connector;
a harness provided at the connector and configured to transmit an electric signal to a controller;
a magnetic sensor serving as a sensor member, disposed in the connector so as to protrude within the torque sensor container portion toward a first opening portion side, including a Hall element configured to detect a change in a magnetic field between the first and second magnetism collection rings that change their respective internal magnetic fields by being affected by magnetic fields of the first and second cylindrical portions that change according to a change in a relative angle between the magnetic member and the first and second claw portions that is caused by a torsion of the torsion bar, and configured to output the change in the magnetic field to the controller as the electric signal; and
an electric motor configured to be driven and controlled based on a motor control signal calculated by the controller based on the change in the magnetic field to provide an operation force to the steering mechanism,
the method for assembling the power steering apparatus comprising:
a first step of setting the magnetic sensor into the connector in such a manner that the magnetic sensor and the harness are electrically connected to each other;
a second step of inserting the connector and the magnetic sensor from an opposite side of the connector insertion hole in the radial direction toward one side of the connector insertion hole in the radial direction, the second step being performed subsequently to the first step; and
a third step of inserting the first magnetism collection ring and the second magnetism collection ring into the torque sensor container portion from the first opening portion in such a manner that the magnetic sensor is situated between the first magnetism collection ring and the second magnetism collection ring in the radial direction, the third step being performed subsequently to the second step.

13. The method for assembling the power steering apparatus according to claim 12, wherein the power steering apparatus further comprises a magnetism collection ring holding member disposed in the torque sensor container portion, formed with use of an insulating material, and configured to hold the first magnetism collection ring and the second magnetism collection ring.

14. The method for assembling the power steering apparatus according to claim 13, wherein the power steering apparatus further comprises an adhesive agent supplied into between the first and second magnetism collection rings in the radial direction before the first and second magnetism collection rings are mounted into the first housing to thereby fix the first and second magnetism collection rings and the magnetic sensor to each other when the first and second magnetism collection rings are mounted in the first housing.

15. The method for assembling the power steering apparatus according to claim 14, wherein the magnetism collection ring holding member includes a magnetic sensor insertion portion into which the magnetic sensor is inserted,
wherein the magnetic sensor insertion portion is formed into a bottomed shape including an opening portion that is open to the one side in the axial direction, and wherein the adhesive agent is supplied into the magnetic sensor insertion portion.

16. The method for assembling the power steering apparatus according to claim 13, wherein an opening portion of the magnetism collection ring holding member includes an inclined surface formed in such a manner that an opening width gradually reduces from the one side in the axial direction toward the opposite side in the axial direction.

17. The method for assembling the power steering apparatus according to claim 13, wherein the magnetism collection ring holding member includes a connector engagement portion, and
    wherein the connector includes a connector engagement target portion configured to be engaged with the connector engagement portion of the magnetism collection ring holding member to thereby hold the connector so as to prevent the connector from being pulled out from the connector insertion hole.

18. The method for assembling the power steering apparatus according to claim 12, wherein the first housing includes a bearing holding portion provided on the one side in the axial direction with respect to the torque sensor container portion and configured to hold a bearing rotatably supporting the input shaft, and
    wherein the bearing holding portion, the torque sensor container portion, the connector insertion hole, and the first opening portion are integrally molded.

19. The method for assembling the power steering apparatus according to claim 12, wherein the power steering apparatus further comprises a substrate disposed in the connector and configured in such a manner that the magnetic sensor is electrically connected to the substrate,
    wherein the connector includes a substrate mounting portion provided so as to extend in a direction along which the connector is inserted into the connector insertion hole, and configured in such a manner that the substrate is set on the substrate mounting portion, and
    wherein the substrate mounting portion is formed in such a manner that the connector insertion hole and the magnetic sensor are prevented from contacting each other with an aid of abutment between the connector insertion hole and the substrate mounting portion when the substrate mounting portion and the magnetic sensor are inserted into the connector insertion hole.

20. The method for assembling the power steering apparatus according to claim 12, wherein the power steering apparatus further comprises a substrate disposed in the connector and configured in such a manner that the magnetic sensor is electrically connected to the substrate,
    wherein the connector includes a substrate mounting portion provided so as to extend in a direction along which the connector is inserted into the connector insertion hole, and configured in such a manner that the substrate is set on the substrate mounting portion,
    wherein the substrate mounting portion includes a substrate holding portion that limits a movement of the substrate in a thickness direction of the substrate, assuming that the thickness direction of the substrate is a direction orthogonal to a surface where the magnetic sensor is connected to the substrate, and
    wherein the substrate holding portion is disposed so as to generate a predetermined space between the substrate holding portion and the substrate in the thickness direction of the substrate.

* * * * *